US012643378B2

(12) United States Patent
Nishio et al.

(10) Patent No.: US 12,643,378 B2
(45) Date of Patent: Jun. 2, 2026

(54) VEHICLE CONTROL METHOD, AUTOMATIC DOOR CONTROL METHOD, VEHICLE CONTROL DEVICE, AND AUTOMATIC DOOR CONTROL DEVICE

(71) Applicant: PANASONIC AUTOMOTIVE SYSTEMS CO., LTD., Kanagawa (JP)

(72) Inventors: Tsuyoshi Nishio, Chiba (JP); Yohei Tanaka, Kanagawa (JP); Yuki Nishida, Kanagawa (JP); Toshihiro Miyamichi, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 114 days.

(21) Appl. No.: 18/918,906

(22) Filed: Oct. 17, 2024

(65) Prior Publication Data

US 2025/0128578 A1     Apr. 24, 2025

(30) Foreign Application Priority Data

Oct. 20, 2023     (JP) ................................. 2023-181387

(51) Int. Cl.
| | |
|---|---|
| *B60J 3/04* | (2006.01) |
| *B60J 5/06* | (2006.01) |
| *E06B 9/24* | (2006.01) |

(52) U.S. Cl.
CPC . *B60J 3/04* (2013.01); *B60J 5/06* (2013.01); *E06B 9/24* (2013.01); *E06B 2009/2464* (2013.01)

(58) Field of Classification Search
CPC ....... B60J 3/04; B60J 5/06; E06B 9/24; E06B 2009/2464

(Continued)

(56) References Cited

U.S. PATENT DOCUMENTS

| | | | | |
|---|---|---|---|---|
| 9,321,332 B2 * | 4/2016 | Yamane | ................ | B60R 16/023 |
| 11,829,970 B2 * | 11/2023 | Shell | ..................... | G06Q 10/02 |

(Continued)

FOREIGN PATENT DOCUMENTS

| | | | | |
|---|---|---|---|---|
| CN | 116766895 A | * | 9/2023 | ................ B60J 3/04 |
| JP | 2005-7920 | | 1/2005 | |

(Continued)

OTHER PUBLICATIONS

English translation of CN116766895, acquired via Espacenet Mar. 2026 (Year: 2026).*

*Primary Examiner* — Krishnan Ramesh

(74) *Attorney, Agent, or Firm* — GREENBLUM & BERNSTEIN, P.L.C.

(57) ABSTRACT

A vehicle includes a vehicle body, a wheel group connected to the vehicle body, a door disposed on the vehicle body and opened by an actuator in a first direction, and a planar light shielding member disposed on the door, having a variable light transmittance and including at least a first region and a second region that are disposed along the first direction. When the vehicle is in a first state, the first region and the second region of the light shielding member in the door have a first light transmittance. When the vehicle is in a second state, the second region remains at the first light transmittance, and the first region has a second light transmittance larger than the first light transmittance. Thereafter, an opening operation of the door in the first direction is completed.

20 Claims, 17 Drawing Sheets

(58) Field of Classification Search
USPC .......................................................... 701/36
See application file for complete search history.

(56)                         References Cited

U.S. PATENT DOCUMENTS

| | | | |
|---|---|---|---|
| 12,090,821 B1 * | 9/2024 | Chen | G02F 1/13725 |
| 2003/0151272 A1 * | 8/2003 | Sugimoto | B60J 3/007 |
| | | | 296/97.2 |
| 2018/0079284 A1 * | 3/2018 | Choi | B60J 1/17 |
| 2019/0092221 A1 * | 3/2019 | Kimura | B60Q 1/085 |
| 2024/0385487 A1 * | 11/2024 | Yande | B60K 35/10 |

FOREIGN PATENT DOCUMENTS

| | | |
|---|---|---|
| JP | 2006-88942 | 4/2006 |
| JP | 2020-197590 | 12/2020 |

* cited by examiner

FIRST DIRECTION

VEHICLE CONTROL METHOD, AUTOMATIC DOOR CONTROL METHOD, VEHICLE CONTROL DEVICE, AND AUTOMATIC DOOR CONTROL DEVICE

TECHNICAL FIELD

The present disclosure relates to a vehicle control method, an automatic door control method, a vehicle control device, and an automatic door control device.

BACKGROUND ART

Patent Literature 1 discloses a vehicular dimmer glass control system including: a vehicle entrance door; an entrance window disposed in the entrance door and made of a dimmer glass that can be switched between at least two light shielding states, a smoked state and a transparent state, depending on a level of an obscuration ratio; a door opening and closing operation unit that operates the opening and closing of the entrance door; a door open or closed state detection unit that detects an open or closed state of the entrance door; and a window switching unit that automatically switches a light shielding state of the entrance window to a transparent state or a smoked state based on the open or closed state and an operation state detected by the door open or closed state detection unit and the operation state detection unit.

CITATION LIST

Patent Literature

Patent Literature 1: JP2005-7920A
Patent Literature 2: JP2006-88942A
Patent Literature 3: JP2020-197590A

SUMMARY OF INVENTION

When the window of the door is simply switched from the light shielding state to the transparent state as in Patent Literature 1, a person cannot recognize an opening direction of the door. An object of the present disclosure is to provide a technique for causing a person to recognize an opening direction of a door by appropriately changing a light transmittance of a light shielding member of a door.

A vehicle control method for a vehicle capable of traveling in a predetermined direction using a wheel group according to the present disclosure is provided. The vehicle includes a vehicle body; the wheel group connected to the vehicle body; a door disposed on the vehicle body and opened by an actuator in a first direction; and a planar light shielding member disposed on the door, having a variable light transmittance and including at least a first region and a second region that are disposed along the first direction. when the vehicle is in a first state, the first region and the second region of the light shielding member in the door have a first light transmittance, when the vehicle is in a second state, the second region remains at the first light transmittance, and the first region has a second light transmittance larger than the first light transmittance, and then an opening operation of the door in the first direction is completed.

An automatic door control method according to the present disclosure is provided. The automatic door includes a door opened by an actuator in a first direction; and a planar light shielding member disposed on the door and having a variable light transmittance and including at least a first region and a second region that are disposed along the first direction. The automatic door control method includes, in a case that the vehicle is in a first state, setting the first region and the second region of the light shielding member of the door to a first light transmittance, in a case that the vehicle is in a second state, remaining the second region at the first light transmittance and setting the first region to a second light transmittance larger than the first light transmittance, and completing an opening operation of the door in the first direction A vehicle control device configured to be mounted on a vehicle capable of traveling in a predetermined direction using a wheel group according to the present disclosure is provided. The vehicle control device includes a vehicle body; a wheel group connected to the vehicle body; a door disposed on the vehicle body and opened by an actuator in a first direction; and a planar light shielding member disposed on the door and having a variable light transmittance and including at least a first region and a second region that are disposed along the first direction. When the vehicle is in a first state, the first region and the second region of the light shielding member of the door have a first light transmittance. When the vehicle is in a second state, the second region remains at the first light transmittance, and the first region has a second light transmittance larger than the first light transmittance, and an opening operation of the door in the first direction is completed.

An automatic door control device according to the present disclosure is provided. The automatic door includes a door opened by an actuator in a first direction; and a planar light shielding member disposed on the door and having a variable light transmittance and including at least a first region and a second region that are disposed along the first direction. When the vehicle is in a first state, the first region and the second region of the light shielding member of the door have a first light transmittance. When the vehicle is in a second state, the second region remains at the first light transmittance, and the first region has a second light transmittance larger than the first light transmittance. Then, an opening operation of the door in the first direction is completed.

According to the present disclosure, a person can recognize an opening direction of a door by appropriately changing a light transmittance of a light shielding member of a door.

BRIEF DESCRIPTION OF DRAWINGS

FIG. 6 is a diagram illustrating a timing of a second state and an open state according to Embodiment 1;

FIG. 8 is a diagram illustrating a fourth example of the relation between the opening operation of the door and the change in light transmittance of the light shielding member according to Embodiment 1;

DESCRIPTION OF EMBODIMENTS

Hereinafter, embodiments of the present disclosure will be described in detail with reference to the drawings as appropriate. However, unnecessarily detailed description may be omitted. For example, detailed description of already well-known matters and redundant description of substantially the same configuration may be omitted. This is to avoid unnecessary redundancy of the following description and to facilitate understanding of those skilled in the art. The accompanying drawings and the following description are provided for those skilled in the art to sufficiently understand the present disclosure, and are not intended to limit the subject matter described in claims.

Embodiment 1

Figure 1:
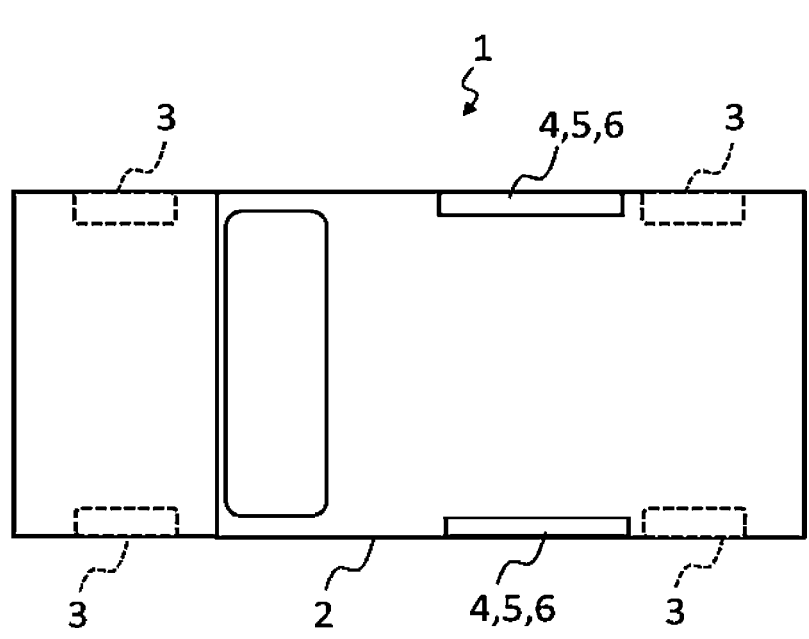
FIG. 1 is a plan view illustrating a configuration example of a vehicle according to Embodiment 1.
Figure 1:
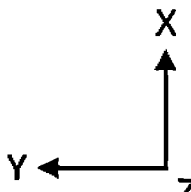
Figure 2:
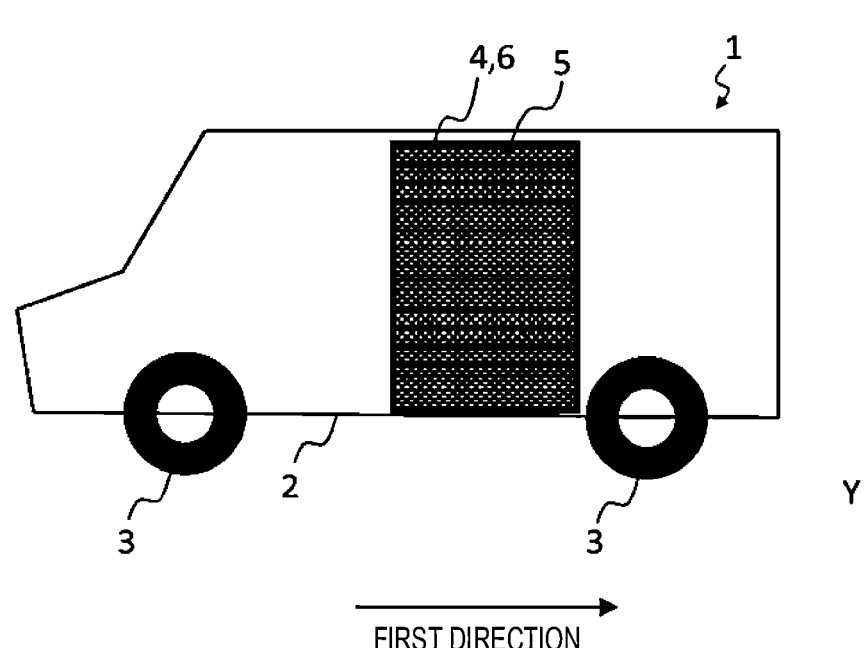
FIG. 2 is a side view illustrating a configuration example of the vehicle according to Embodiment 1.
Figure 2:
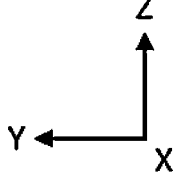

FIG. 1 is a plan view (view seen from above) illustrating a configuration example of a vehicle 1 according to Embodiment 1. FIG. 2 is a side view (view seen from the side) illustrating a configuration example of the vehicle according to Embodiment 1.

For convenience of description, as illustrated in FIGS. 1 and 2, an entire length direction of the vehicle 1 is defined as a Y axis, a width direction of the vehicle 1 is defined as an X axis, and a height direction of the vehicle 1 is defined as a Z axis. For convenience of description, a positive direction of the Y axis may be referred to as "front", a negative direction of the Y axis may be referred to as "rear", a positive direction of the X axis may be referred to as "right", and a negative direction of the X axis may be referred to as "left", a positive direction of the Z axis may be referred to as "upper", a negative direction of the Z axis may be referred to as "lower". The expressions related to these directions are used for convenience of explanation, and are not intended to limit a posture of the structure in actual use.

The vehicle 1 includes a vehicle body 2, a plurality of wheels (a wheel group 3) coupled to the vehicle body 2, a door 4 disposed on the vehicle body 2, a planar light shielding member 5 having a variable light transmittance and disposed on the door 4, and an entrance 6 through which a person gets on and off. The number of wheels may be two, three, four, or five or more. The vehicle 1 can travel in a predetermined direction using the wheel group 3. Examples of the vehicle 1 include a passenger car, a bus, a camper, and a truck.

The door 4 opens in a first direction and closes in a second direction opposite to the first direction by an actuator. The door 4 may be disposed on a side surface of the vehicle body 2, and the first direction may be a direction along the side surface. In this case, the door 4 may be a slide door that opens in the first direction (for example, the negative direction of the Y-axis) and closes in the second direction (for example, the positive direction of the Y-axis) in a state along the side surface. However, the door 4 according to Embodiment 1 is not limited to a slide door, and may be, for example, a swing door or a plug door.

Figure 3A:
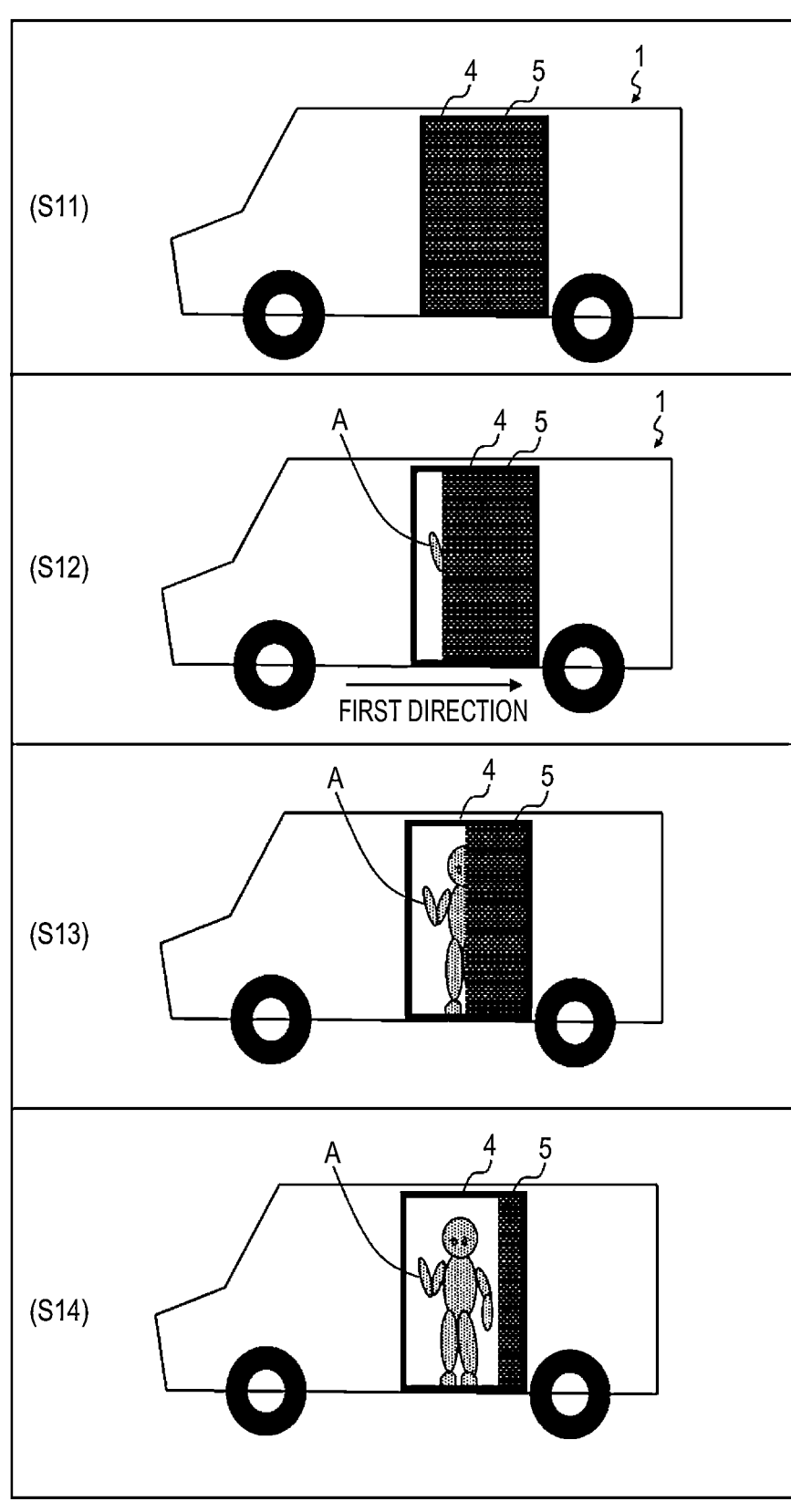
FIG. 3A is a diagram illustrating a relation between an opening operation of a door and a light transmittance of a light shielding member according to Embodiment 1 (part 1)
Figure 3B:
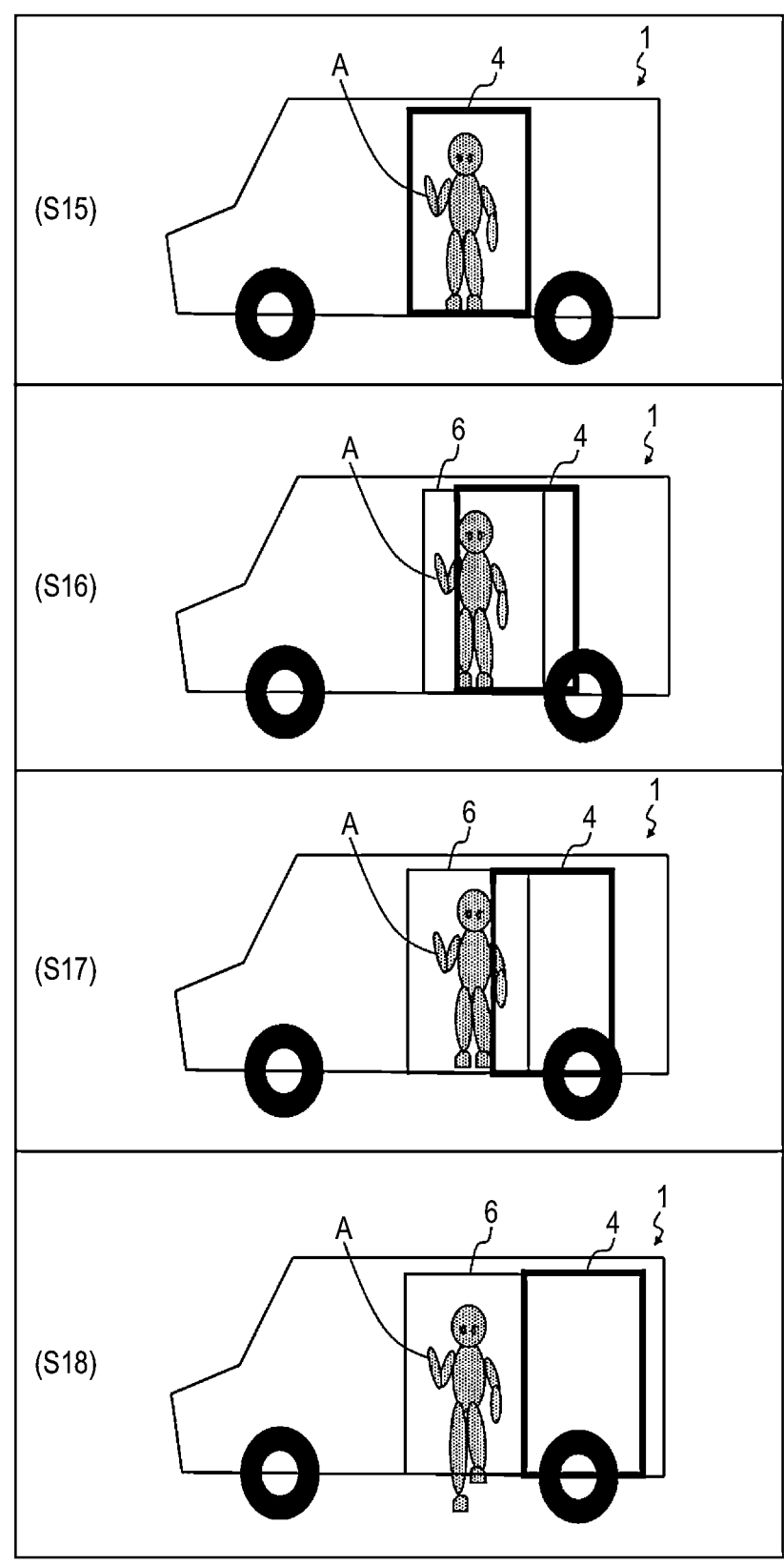
FIG. 3B is a diagram illustrating a relation between the opening operation of the door and the light transmittance of the light shielding member according to Embodiment 1 (part 2)

FIGS. 3A and 3B are diagrams illustrating a relation between an opening operation of the door 4 and a light transmittance of the light shielding member 5 according to Embodiment 1.

It has been studied to use the light shielding member 5 for the door 4 for the purpose of increasing the spread of autonomous driving, improving the air conditioning efficiency in the vehicle, ensuring the privacy of an occupant, and the like. However, in a case where the light shielding member 5 is used for the door 4, a person cannot see the outside when getting off the door 4, which may be uneasy. In a case where the entire surface of the door 4 of the vehicle 1 is the light shielding member 5, an inconvenience that a position of the door 4 is difficult to understand at the time of getting on the vehicle and an anxiety that a state of the vehicle is not known may be given to a person who gets on the vehicle.

The vehicle 1 according to Embodiment 1 performs the following operation as illustrated in FIGS. 3A and 3B. (S11) When the vehicle 1 detects a person A who stands in front of the door 4, the vehicle 1 performs the processes in S12 and subsequent steps. (S12) to (S14) In the vehicle 1, the light shielding member 5 of the door 4 is sequentially made transparent in the first direction, which is an opening direction of the door 4. Accordingly, the person A can recognize that the door 4 opens and the door 4 that is sequentially transparent opens in the first direction. (S15) to (S18) After that, the vehicle 1 automatically opens the door 4 in the first direction, and the person A gets out of the entrance 6.

According to the above process, the person A in the vehicle can confirm the outside from the transparent door 4 before the person A gets off the vehicle, and get off the vehicle reliably, safely, and comfortably. A person outside the vehicle can visually recognize the transparent door 4 and confirm that the person A is getting off the vehicle 1. Accordingly, the safety of a person outside the vehicle is also improved.

Hereinafter, operations illustrated in FIGS. 3A and 3B will be described in more detail.

Figure 4:
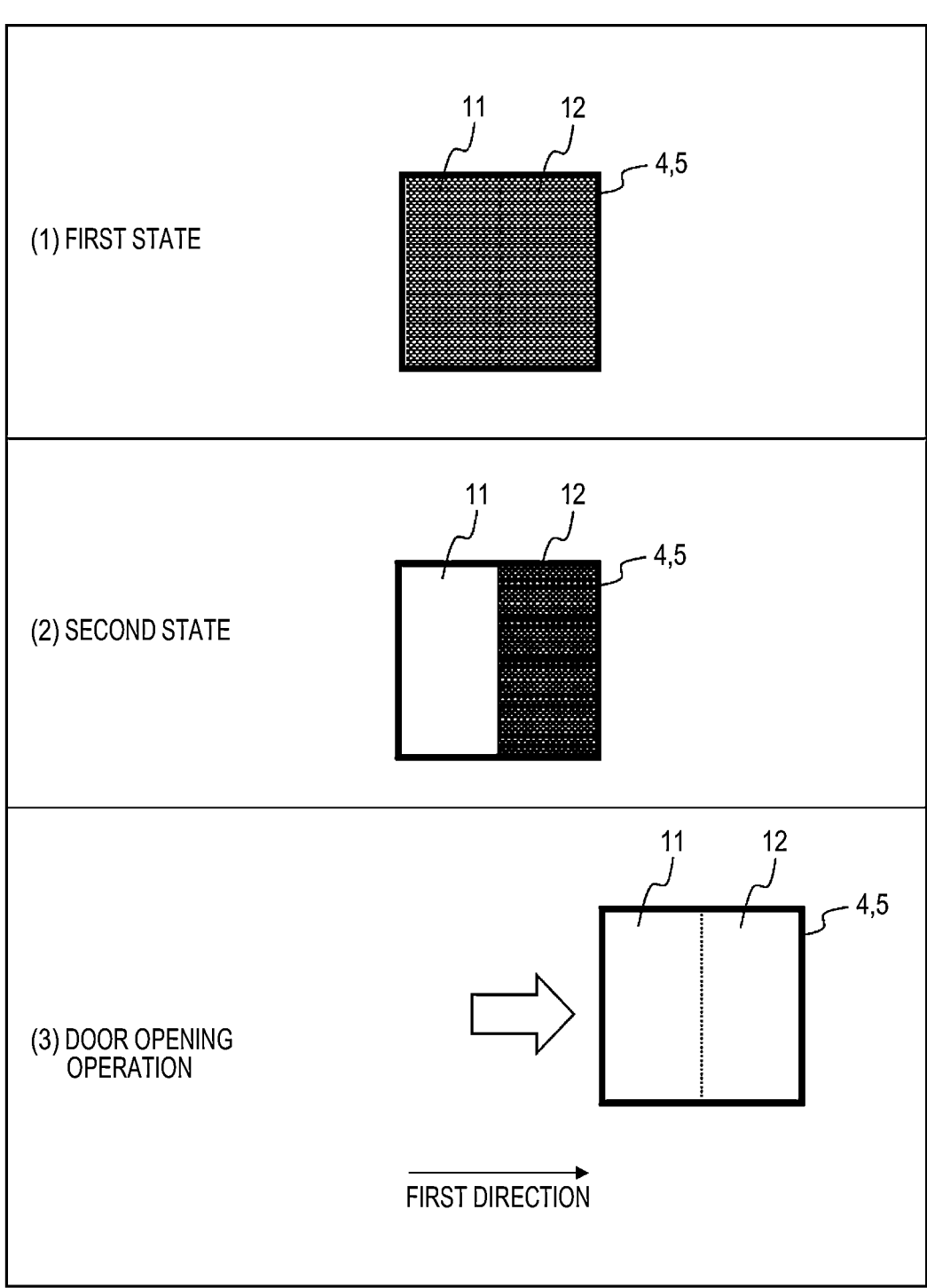
FIG. 4 is a diagram illustrating a first example of a relation between the opening operation of the door and a change in light transmittance of the light shielding member according to Embodiment 1.

FIG. 4 is a diagram illustrating a first example of a relation between the opening operation of the door 4 and a change in light transmittance of the light shielding member 5 according to Embodiment 1.

As illustrated in FIG. 4, the light shielding member 5 provided in the door 4 includes a first region 11 and a second region 12 that are divided in the first direction. In FIG. 4, a dotted line between the first region 11 and the second region 12 is drawn for convenience for easy understanding of a boundary of the region, and is not actually present.

As illustrated in (1) of FIG. 4, when the vehicle 1 is in a first state, the first region 11 and the second region 12 of the light shielding member 5 of the door 4 have a first light transmittance.

As illustrated in (2) of FIG. 4, when the vehicle 1 is in a second state, the second region 12 remains at the first light transmittance, and the first region 11 has a second light transmittance. The second light transmittance is larger than the first light transmittance. For example, the first light transmittance may be a transmittance close to non-transmission, and the second light transmittance may be a transmittance close to transparency. The first light transmittance also includes decreasing the light transmittance by diffusing transmitted light as in the case of a ground glass.

Then, as illustrated in (3) of FIG. 4, the opening operation of the door 4 in the first direction is completed.

In the above description, the first state is a state where there is no trigger to open the door 4 in a traveling state or a stop state of the vehicle 1. The second state is a state where there is a trigger to open the door 4 at least in the stop state of the vehicle 1. In a case where the door 4 is a manual door, a case where a person manually opens the door 4 is exemplified as an example of a trigger to open the door. In a case where the door 4 is an automatic door, a case where a driver performs an operation of opening the door 4, a case where a person stands in front of the door 4, a case where the vehicle arrives at a destination by navigation or autonomous driving, and the like are exemplified as an example of a trigger to open a door. In the second state, at least one of a fact that a speed of the vehicle 1 is 0, a fact that a parking brake is ON, a fact that a footbrake is ON, and a fact that a key of the door 4 is unlocked may be added to a fact that the vehicle 1 is in the stop state.

Figure 5:
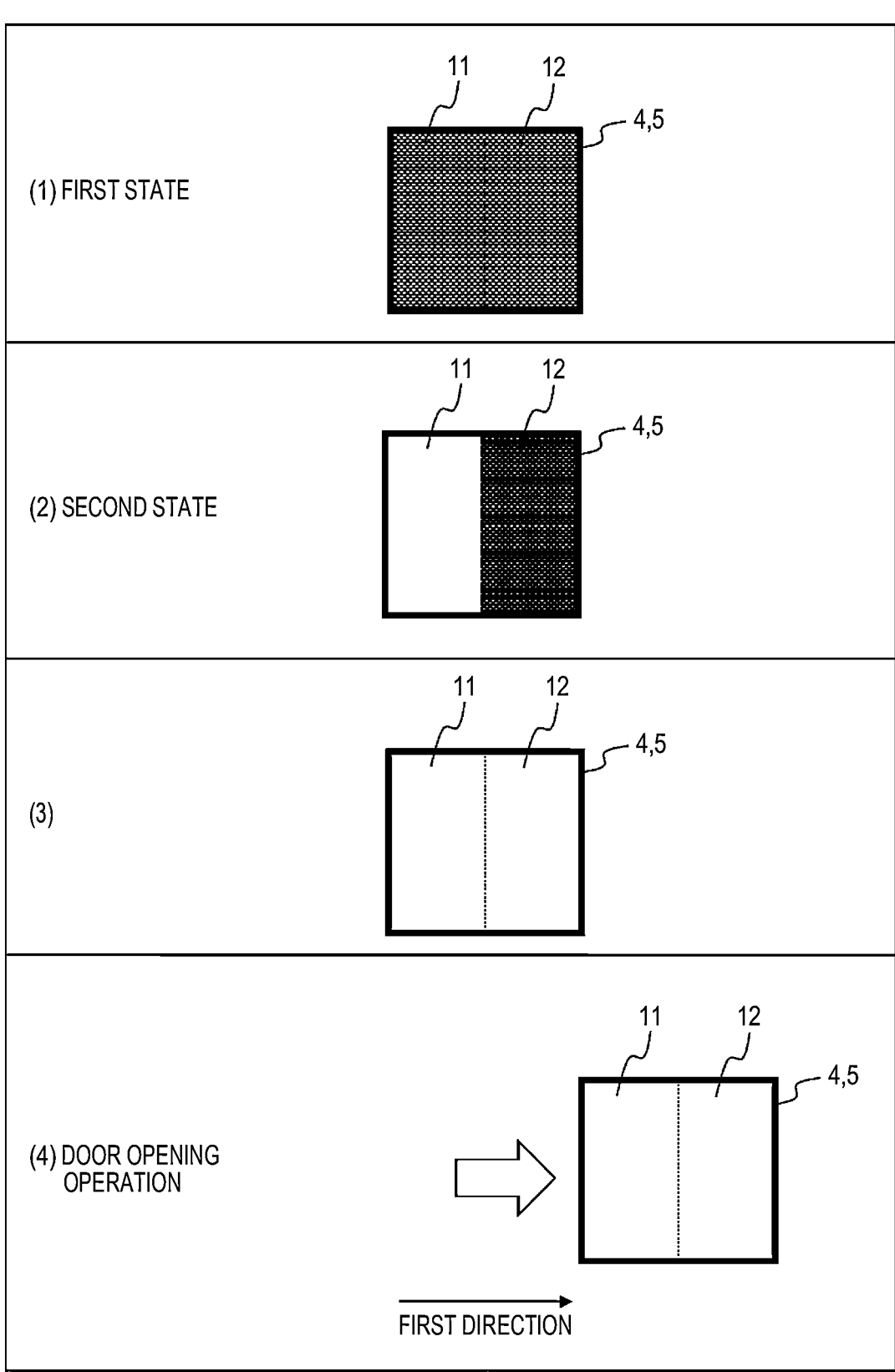
FIG. 5 is a diagram illustrating a second example of the relation between the opening operation of the door and the change in light transmittance of the light shielding member according to Embodiment 1.

FIG. 5 is a diagram illustrating a second example of a relation between the opening operation of the door 4 and a change in light transmittance of the light shielding member 5 according to Embodiment 1.

As illustrated in (1) of FIG. 5, when the vehicle 1 is in the first state, the first region 11 and the second region 12 of the light shielding member 5 of the door 4 have the first light transmittance.

As illustrated in (2) of FIG. 5, when the vehicle 1 is in the second state, the second region 12 remains at the first light transmittance, and the first region 11 has the second light transmittance.

Then, as illustrated in (3) of FIG. 5, the first region 11 remains at the second light transmittance, and the second region 12 has the second light transmittance.

Then, as illustrated in (4) of FIG. 5, the opening operation of the door 4 in the first direction is completed.

According to the operation illustrated in FIG. 4 or 5, a person can recognize that the door 4 opens in the first direction by viewing a mode in which the light shielding member 5 of the door 4 sequentially changes the light transmittance from the first light transmittance to the second light transmittance in the first direction.

Figure 6:
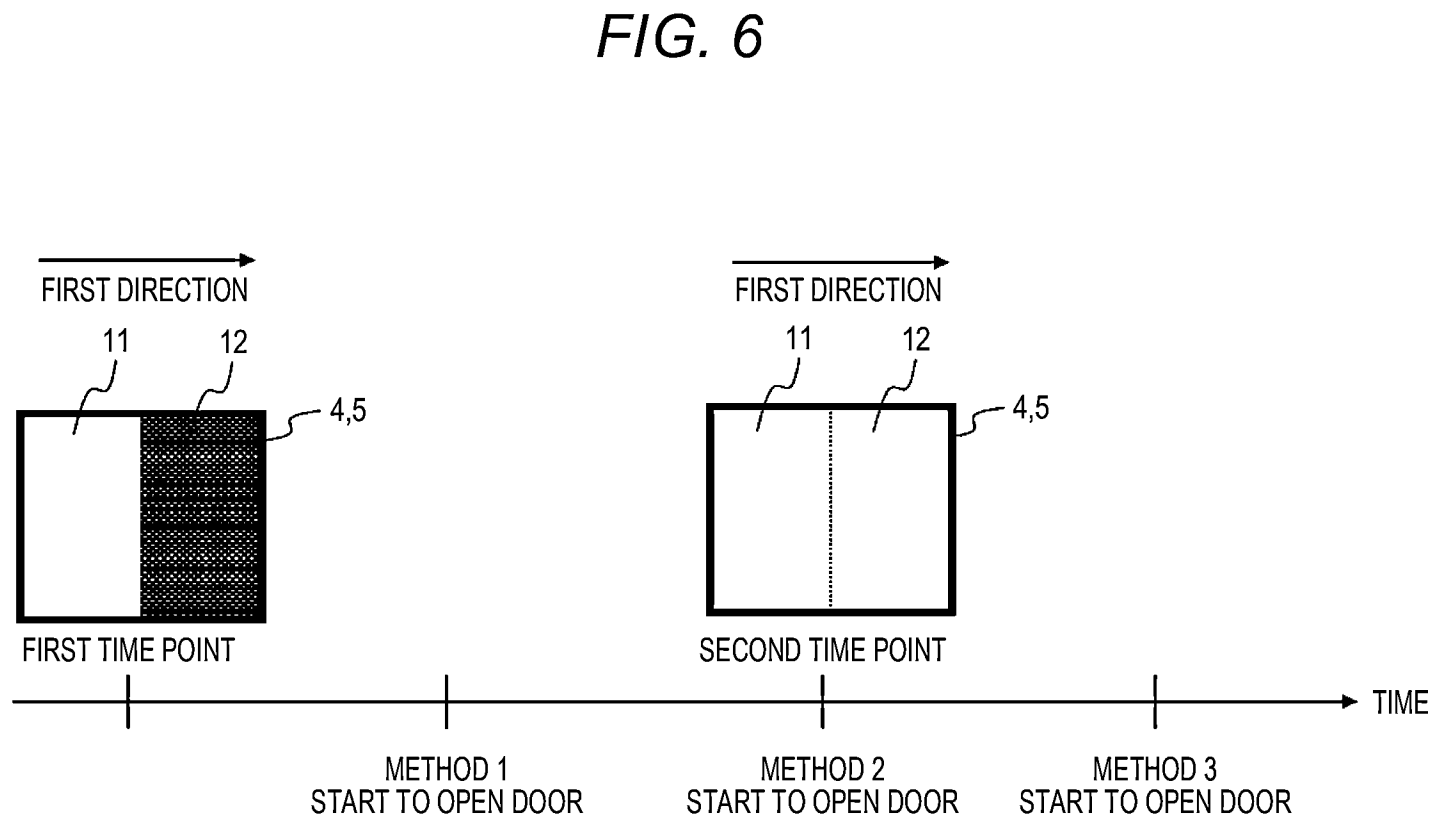

FIG. 6 is a diagram illustrating a timing of the second state and an open state according to Embodiment 1.

As illustrated in FIG. 6, the first region 11 may be disposed in contact with one end of the light shielding member 5 in the first direction, and the second region may be disposed in contact with the other end of the light shielding member 5 in the first direction.

When the vehicle 1 is in the second state, at a first time point, the second region 12 may remain at the first transmittance, the first region 11 may have the second light transmittance, and at a second time point then, the first region 11 may remain at the second light transmittance, and the second region 12 may have the second light transmittance.

In a method 1, the vehicle 1 may start the opening operation of the door 4 before the second time point. Accordingly, the opening operation of the door 4 creates a pleasing atmosphere.

In a method 2, the vehicle 1 may start the opening operation of the door 4 at the same time as the second time point. Accordingly, the change in light transmittance of the light shielding member 5 and the opening operation of the door 4 become seamless, and the opening operation of the door 4 creates a comfortable atmosphere.

In a method 3, the vehicle 1 may start the opening operation of the door 4 after the second time point. Accordingly, the opening operation of the door 4 gives a solemn and heavy atmosphere.

Figure 7:
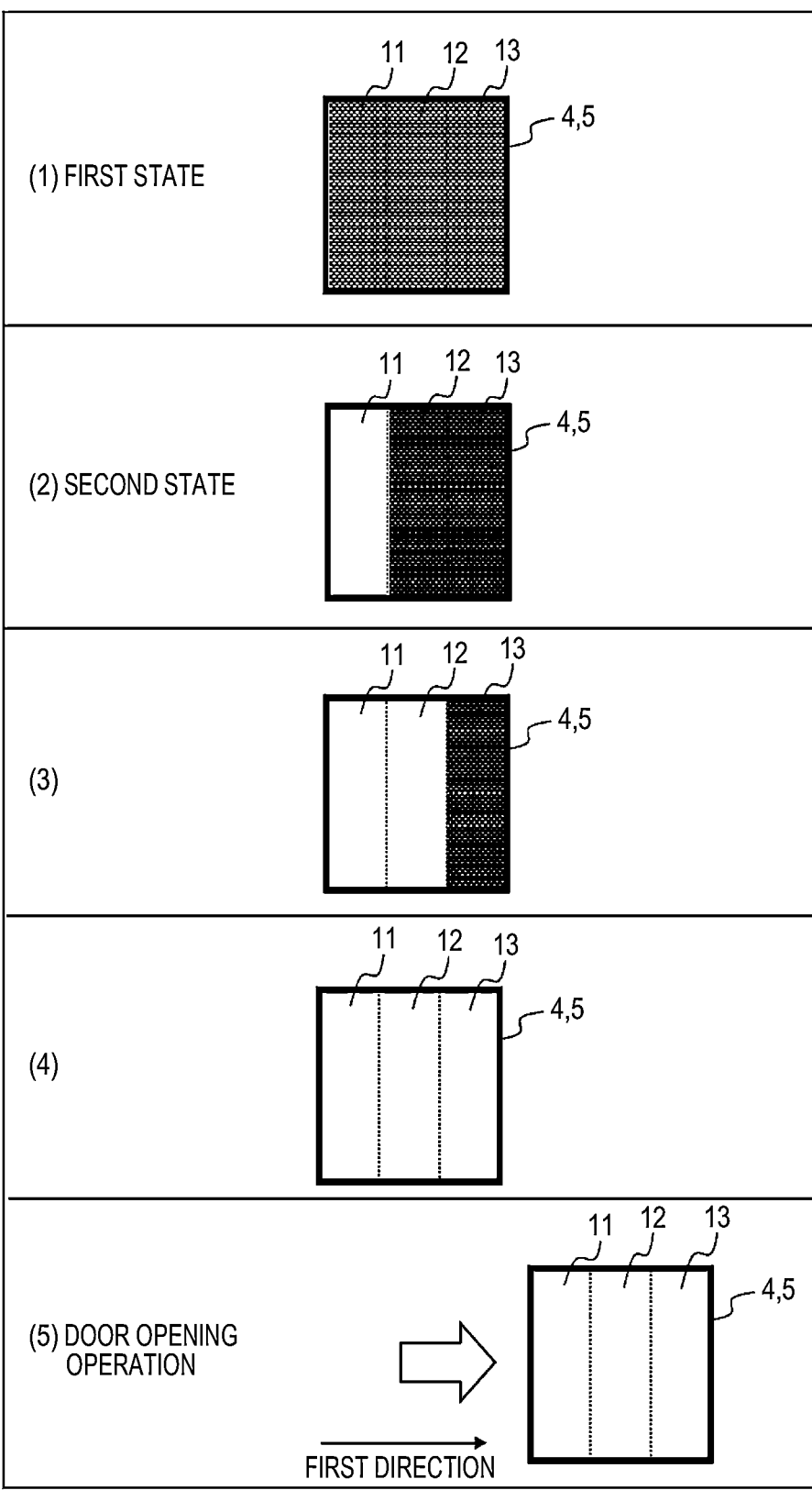
FIG. 7 is a diagram illustrating a third example of the relation between the opening operation of the door and the change in light transmittance of the light shielding member according to Embodiment 1.

FIG. 7 is a diagram illustrating a third example of a relation between the opening operation of the door 4 and a change in light transmittance of the light shielding member 5 according to Embodiment 1.

As illustrated in FIG. 7, the light shielding member 5 includes the first region 11, the second region 12, and a third region 13. The third region 13 is adjacent to the second region 12. The first region 11, the second region 12, and the third region 13 are disposed along the first direction.

As illustrated in (1) of FIG. 7, when the vehicle 1 is in the first state, the first region 11, the second region 12, and the third region 13 of the light shielding member 5 of the door 4 have the first light transmittance.

As illustrated in (2) of FIG. 7, when the vehicle 1 is in the second state, the second region 12 and the third region 13 remain at the first light transmittance, and the first region 11 has the second light transmittance.

As illustrated in (3) of FIG. 7, after that, the first region 11 remains at the second light transmittance, the third region 13 remains at the first light transmittance, and the second region 12 has the second light transmittance.

As illustrated in (4) of FIG. 7, after that, the first region 11 and the second region 12 remain at the second light transmittance, and the third region 13 has the second light transmittance.

Then, as illustrated in (5) of FIG. 7, the opening operation of the door 4 in the first direction is completed.

According to the operation illustrated in FIG. 7, a person can recognize that the door 4 opens in the first direction by viewing a mode in which the light shielding member 5 sequentially changes the light transmittance from the first light transmittance to the second light transmittance in the first direction.

Figure 8:
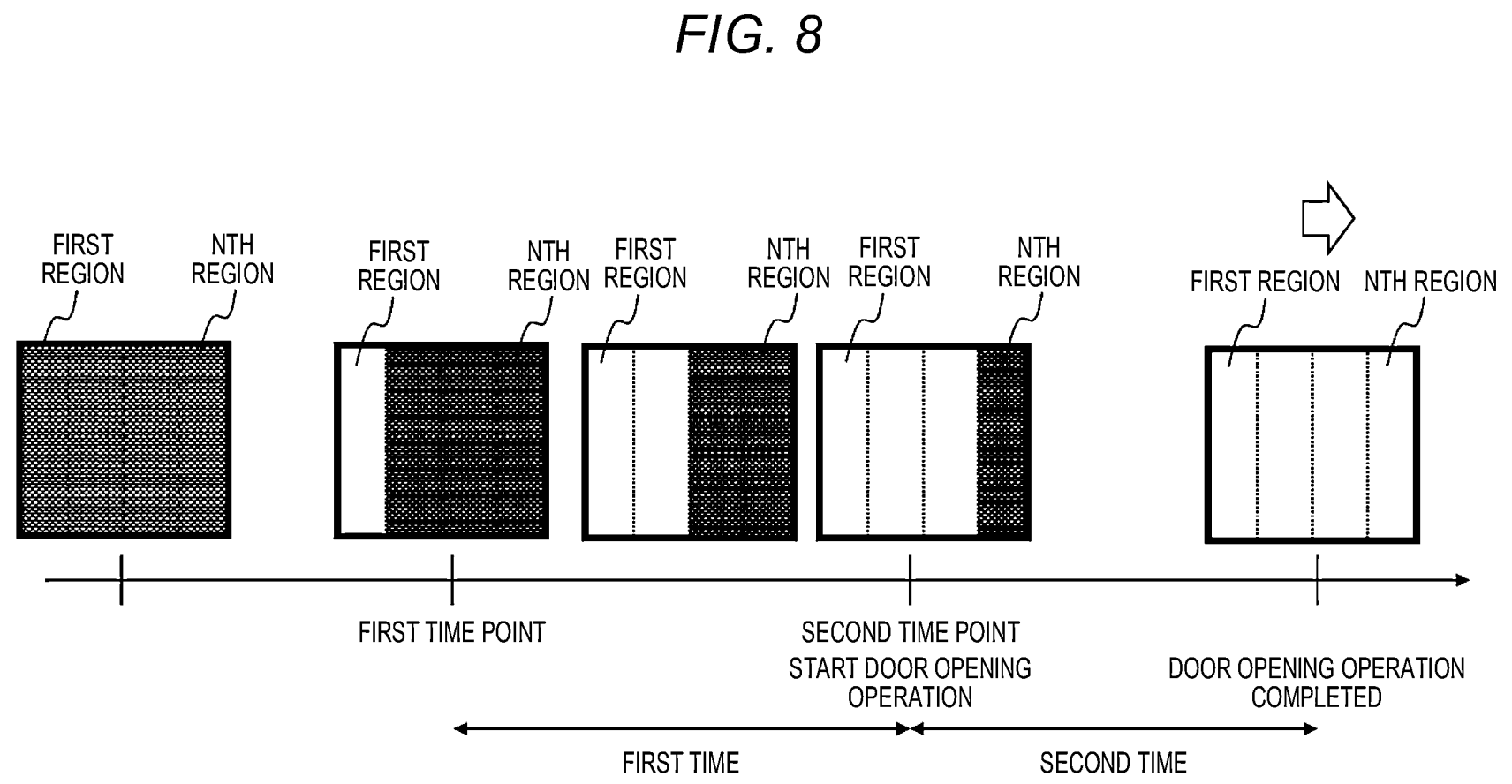

FIG. 8 is a diagram illustrating a fourth example of a relation between the opening operation of the door and a change in light transmittance of the light shielding member 5 according to Embodiment 1.

In the light shielding member 5, (N–2) regions are arranged in order along the first direction between the first region and the second region. Nis an integer of 3 or more, and FIG. 8 is a case of N=4.

The first region is the first region, and the second region is the Nth region.

When the vehicle 1 is in the first state, the first region (the first region) to the Nth region (the Nth region) has the first light transmittance.

When the vehicle 1 is in the second state, at the first time point, the second region (a second region) to the Nth region (the Nth region) remains at the first light transmittance, and the first region has the second light transmittance.

Then, the first light transmittance from the second region to (N–1)th region are sequentially changed to the second light transmittance, respectively.

Next, at the second time point, the first region to the Nth region becomes the second light transmittance.

Next, the opening operation of the door 4 in the first direction is completed.

Here, the first time between the first time point and the second time point corresponds to the second time between a start time and a completion time point of the opening operation of the door 4. In FIG. 8, the start time point of the opening operation of the door is the second time point. The start time point of the opening operation of the door 4 may be before the second time point or after the second time point.

When the first time corresponds to the second time, the first time may be between 60% to 140% of the second time. Accordingly, a person can estimate the second time from the start to the completion of the opening operation of the door 4 from the first time in which the light shielding member 5 changes the light transmittance from the first light transmittance to the second light transmittance.

Figure 9:
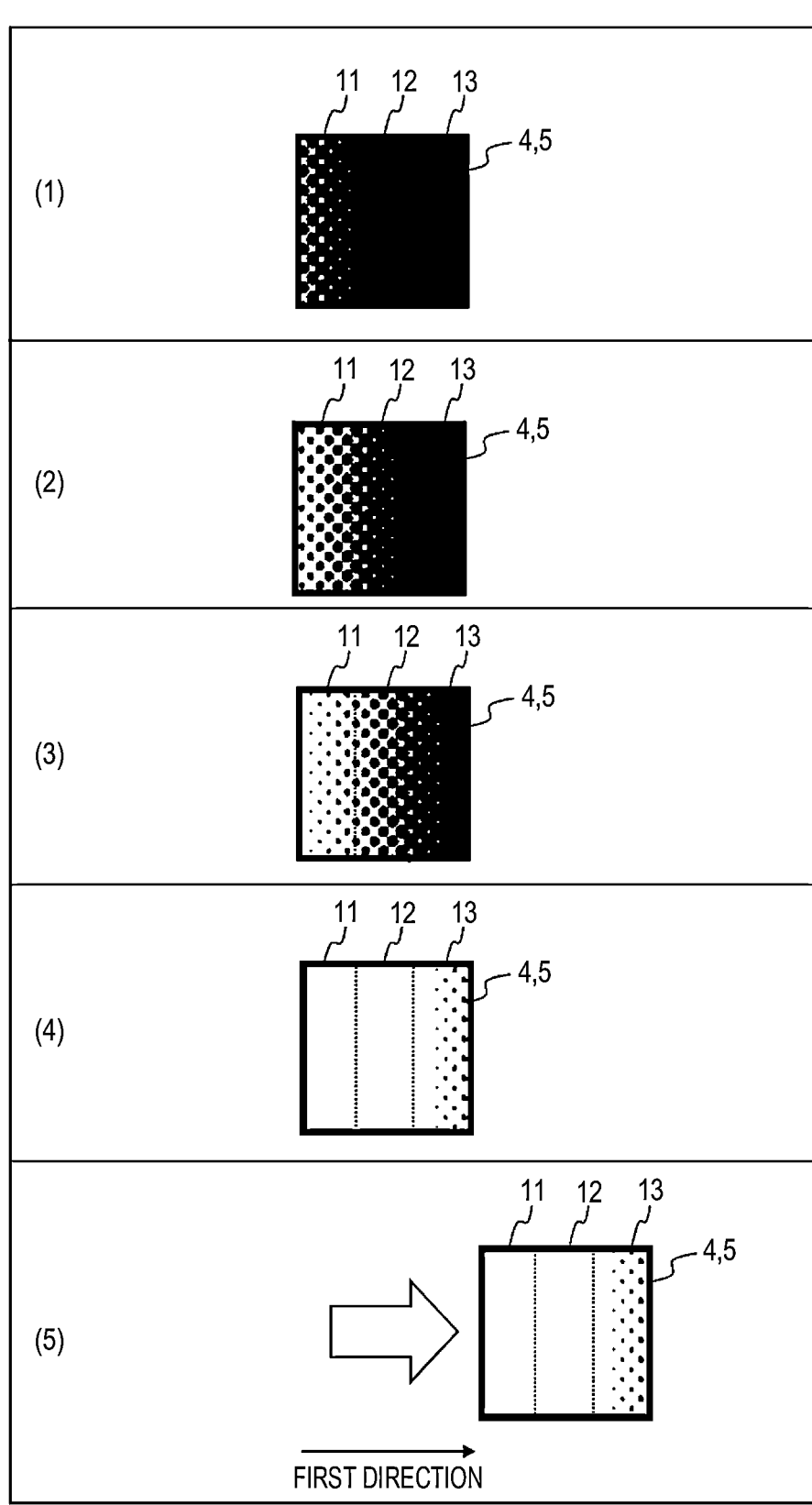
FIG. 9 is a diagram illustrating a modification of a method of changing the light transmittance of the light shielding member according to Embodiment 1.

FIG. 9 is a diagram illustrating a modification of a method of changing the light transmittance of the light shielding member 5 according to Embodiment 1.

In the present embodiment, the description that all regions of the light shielding member 5 have the first light transmittance (for example, non-transmission) may partially have the second light transmittance (for example, transmission) as illustrated in (1) of FIG. 9.

In addition, in the present embodiment, the description that all the regions of the light shielding member 5 have the second light transmittance (for example, transmission) may partially have the first light transmittance (for example, non-transmission) as illustrated in (4) or (5) of FIG. 9.

The change of each region from the first light transmittance to the second light transmittance may be a change in which the first light transmittance and the second light transmittance are alternately repeated when attention is paid to a finer region. In other words, when regions change from the first light transmittance to the second light transmittance, an average of the light transmittance of regions may change from the first light transmittance to the second light transmittance. In this case, as illustrated in (1) to (4) of FIG. 9, an average of the light transmittance of the regions (the first region 11, the second region 12, and the third region 13) of the light shielding member 5 sequentially changes the light transmittance from the first light transmittance to the second light transmittance in the first direction. Then, the door 4 may perform an opening operation as illustrated in (5).

Figure 10:
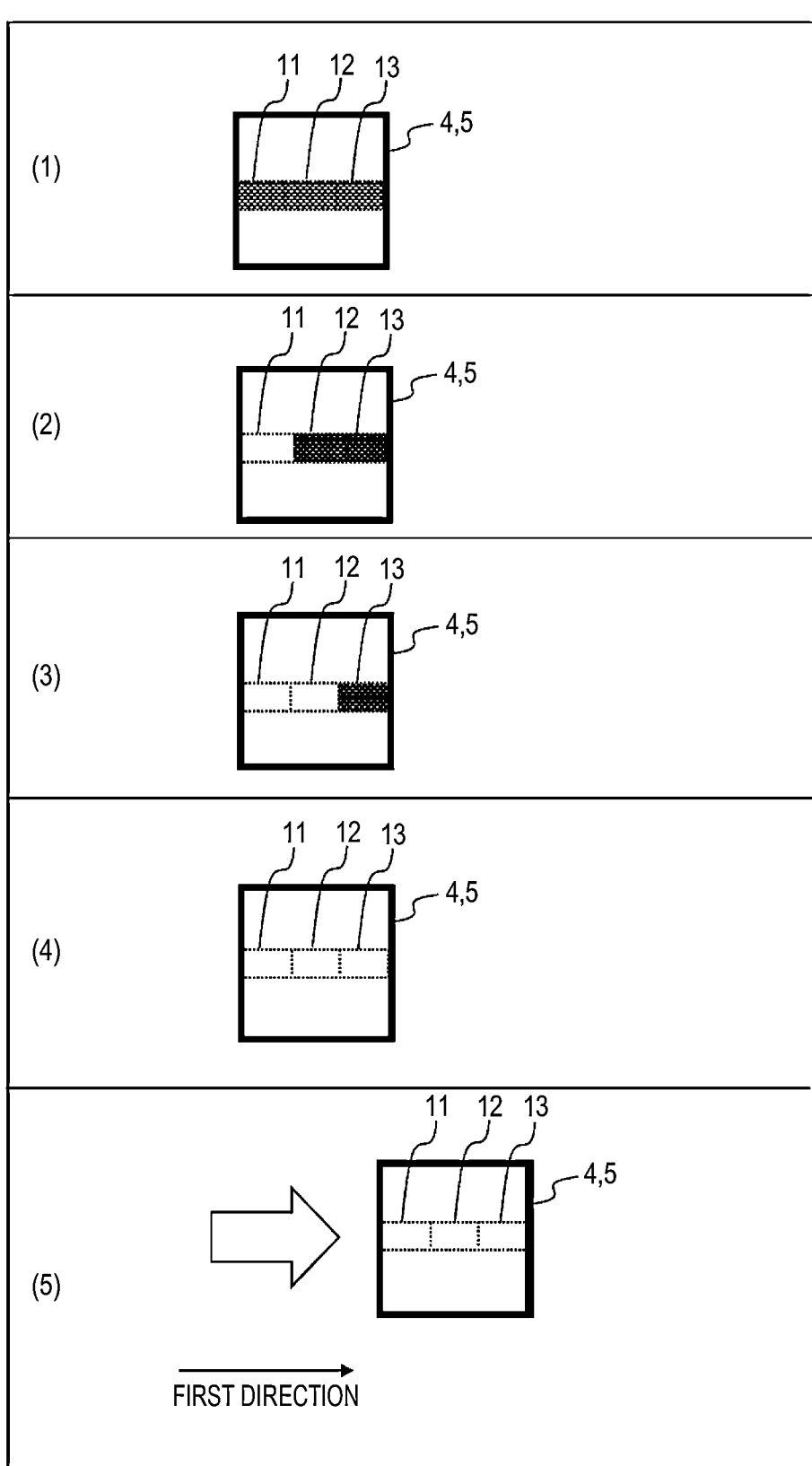
FIG. 10 is a diagram illustrating a modification of a portion where the light transmittance of the light shielding member according to Embodiment 1 changes.

FIG. 10 is a diagram illustrating a modification of a portion where the light transmittance of the light shielding member 5 according to Embodiment 1 changes.

A portion where the light transmittance of the light shielding member 5 is changed is not necessarily the entire surface of the light shielding member 5, and may be, for example, a strip shape along the first direction as illustrated in FIG. 10. In this case, as illustrated in (1) to (4) of FIG. 10, the regions (the first region 11, the second region 12, and the third region 13) of the strip-shaped portion of the light shielding member 5 sequentially change from the first light transmittance to the second light transmittance in the first direction. Then, the door 4 may perform an opening operation as illustrated in (5) of FIG. 10.

A portion other than the strip-shaped portion may has the first light transmittance (for example, non-transmission) or the second light transmittance (for example, transparent).

Figure 11:
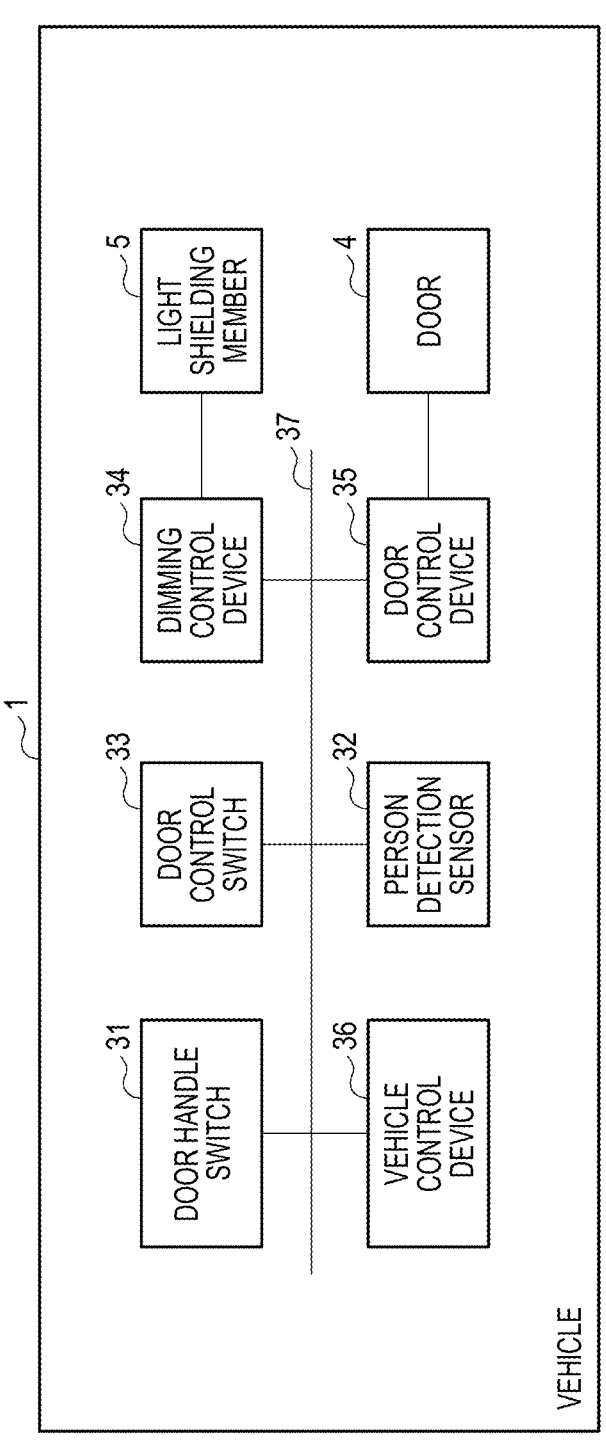
FIG. 11 is a block diagram illustrating an example of a device provided in the vehicle according to Embodiment 1.

FIG. 11 is a block diagram illustrating an example of a device provided in the vehicle 1 according to Embodiment 1.

The vehicle 1 includes a door handle switch 31, a person detection sensor 32, a door control switch 33, a dimming control device 34, a door control device 35, a vehicle control device 36, the light shielding member 5, and the door 4.

The door 4 and the light shielding member 5 are as described above.

The door handle switch 31, the person detection sensor 32, the door control switch 33, the dimming control device 34, the door control device 35, and the vehicle control device 36 can transmit and receive information to and from each other via an in-vehicle network 37. Examples of the in-vehicle network 37 include Controller Area Network (CAN), Local Interconnect Network (LIN), and FlexRay.

The door handle switch 31 is a switch for detecting whether a handle (a door handle) of the door 4 is gripped. The door handle switch 31 may be OFF when the door handle is not gripped, and may be ON when the door handle is gripped.

The person detection sensor 32 is a sensor for detecting a person who stands in front of the door 4 in the vehicle (a person who gets off the vehicle). In addition, the person detection sensor 32 may be a sensor for detecting a person who stands in front of the door 4 (a person who gets on the vehicle) outside the vehicle. Examples of the person detection sensor include a photoelectric sensor, an infrared sensor, and a LiDAR.

The door control switch 33 is a switch that switches whether to automatically open or close the door 4. For example, when the door control switch 33 is ON, the door 4 automatically opens when a predetermined condition is satisfied. The predetermined condition is, for example, the second state described above. When the door control switch 33 is OFF, the door 4 is automatically closed.

The dimming control device 34 is a device that controls a light transmittance of the light shielding member 5 of the door 4. The change from the first light transmittance to the second light transmittance and the change from the second light transmittance to the first light transmittance in the first region 11, the second region 12, the third region 13, and the like of the light shielding member 5 described above may be performed by the dimming control device 34.

The door control device 35 is a device that controls opening and closing of the door 4 using an actuator. The above-described opening and closing of the door 4 may be performed by the door control device 35.

The vehicle control device 36 manages a traveling state, a stop state, and the like of the vehicle 1. When the door handle switch 31 detects the grip of the handle of the door 4, the vehicle control device 36 controls the light transmittance of the light shielding member 5 through the dimming control device 34 as described above, and controls the opening and closing of the door 4 through the door control device 35 as described above. When the person detection sensor 32 detects a person, the vehicle control device 36 controls the light transmittance of the light shielding member 5 through the dimming control device 34 as described above, and controls the opening and closing of the door 4 through the door control device 35 as described above. The vehicle control device 36 may be replaced with an electronic control unit (ECU), a processor, a Central Processing Unit (CPU), a controller, or the like. The vehicle control device 36 may include a volatile storage medium and a non-volatile storage medium such as a memory and a storage. The vehicle control device 36 may implement functions according to the present embodiment by executing a predetermined computer program. An example of a process performed by the vehicle control device 36 will be described later.

<Overall Flow>

Figure 12:
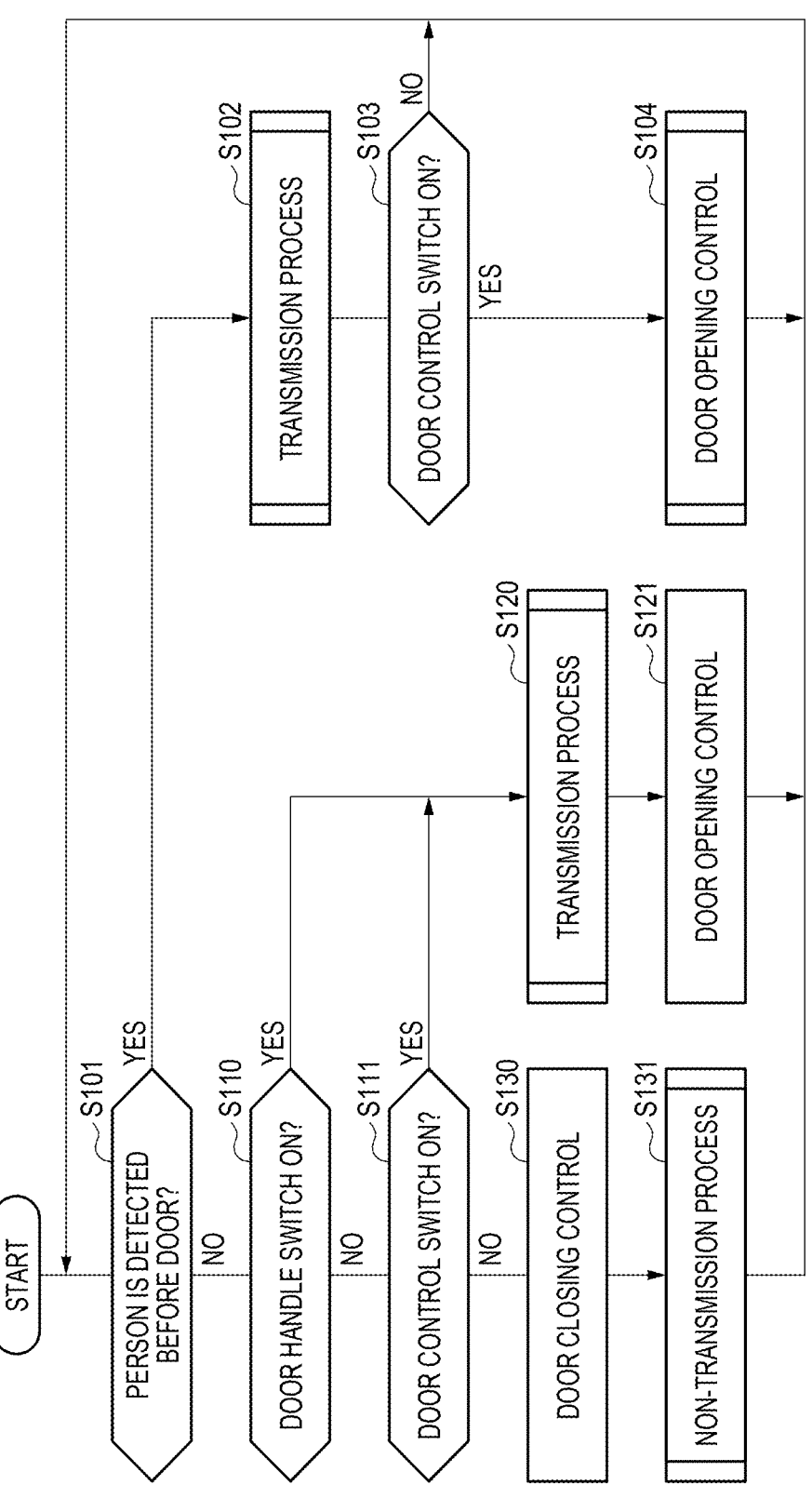
FIG. 12 is a flowchart illustrating an example of a door control process according to Embodiment 1.

FIG. 12 is a flowchart illustrating an example of a door control process according to Embodiment 1. The vehicle control device 36 may perform the following processes.

The vehicle control device 36 determines whether the person detection sensor 32 detects a person in front of the door 4 (S101).

In step S101, when it is determined that a person is detected in front of the door 4 (S101: YES), the vehicle control device 36 performs a transmission process for the light shielding member 5 (S102). Although the details of this transmission process will be described later (refer to FIG. 13), a part of the light shielding member 5 has the second light transmittance (for example, a transmission state) as described above. The vehicle control device 36 determines whether the door control switch 33 is ON (S103).

In step S103, when the door control switch 33 is OFF (S103: NO), the vehicle control device 36 returns the process to step S101. That is, the vehicle control device 36 does not start the opening operation of the door. This is because when the door control switch 33 is OFF, the door 4 is in a closed state.

In step S103, when the door control switch 33 is ON (S103: YES), the vehicle control device 36 performs control to open the door 4 through the door control device 35 (S104). Accordingly, the door 4 opens. Then, the vehicle control device 36 returns the process to step S101.

In step S101, when it is determined that no person is detected in front of the door 4 (S101: NO), the vehicle control device 36 determines whether the door handle switch 31 is ON (that is, whether the door handle is gripped) (S110).

In step S110, when the door handle switch 31 is ON (S110: YES), the vehicle control device 36 advances the process to step S120.

In step S110, when the door handle switch 31 is OFF (S110: NO), the vehicle control device 36 determines whether the door control switch 33 is ON (S111).

In step S111, when the door control switch 33 is ON (S111: YES), the vehicle control device 36 advances the process to step S120.

In step S120, the vehicle control device 36 performs a transmission process for the light shielding member 5 (S120). Details of the transmission process will be described later (see FIG. 13). Then, the vehicle control device 36 performs control to open the door 4 through the door control device 35 (S121). Accordingly, the door 4 opens. In a case where the door 4 is a manual door, the vehicle control device 36 may automatically unlock the door so that the door opens by a hand in step S121. Then, the vehicle control device 36 returns the process to step S101.

In step S11, when the door control switch 33 is OFF (S111: NO), the vehicle control device 36 performs control to close the door through the door control device 35 (S130). Accordingly, the door 4 closes. In a case where the door 4 is a manual door, the door may be automatically locked so that the door opens by a hand in S130. Then, the vehicle control device 36 preforms a non-transmission process for the light shielding member 5 (S131). Although the details of the non-transmission process will be described later (refer to FIG. 14), a part of the light shielding member 5 has the first light transmittance (for example, a non-transmission state). Then, the vehicle control device 36 returns the process to step S101.

<Transmission Process>

Figure 13:
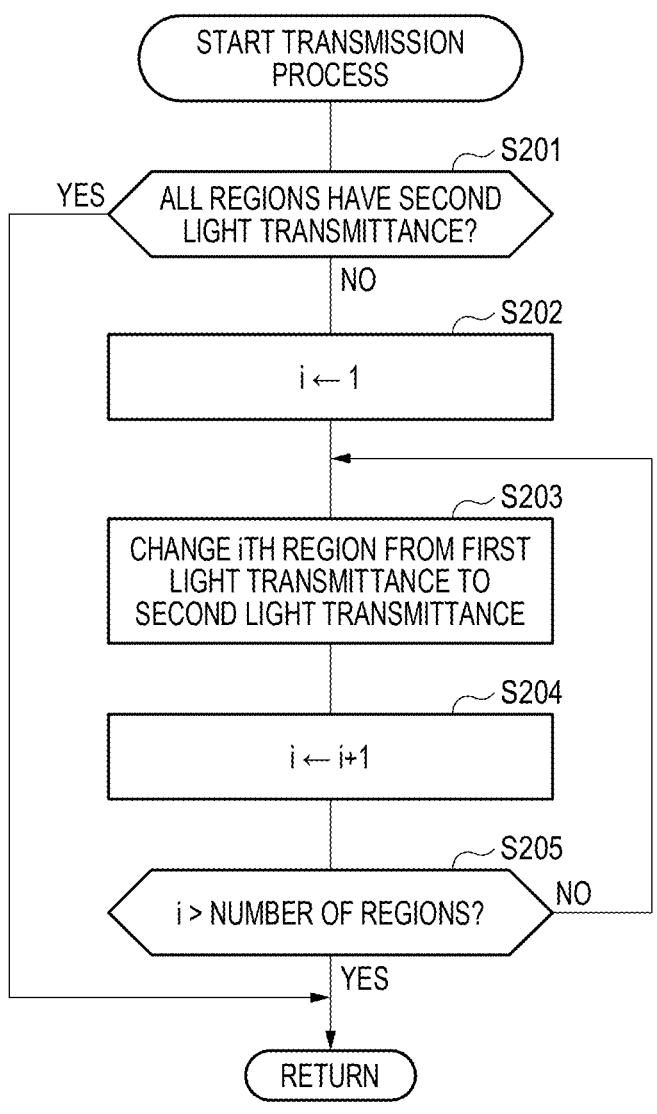
FIG. 13 is a flowchart illustrating an example of a transmission process according to Embodiment 1.

FIG. 13 is a flowchart illustrating an example of a transmission process according to Embodiment 1. The process corresponds to the details of the process of step S102 and step S120 in FIG. 12.

The vehicle control device 36 determines whether all the regions of the light shielding member 5 have already been in the second light transmittance (for example, a transmission state) (S201).

When all the regions have already been in the second light transmittance (S201: YES), the vehicle control device 36 completes the present process, calls the process, and returns to the original process.

When some of the regions do not have the second light transmittance (S201: NO), the vehicle control device 36 sets 1 (initial value) to a variable i (S202).

The vehicle control device 36 changes the i-th region of the light shielding member 5 from the first light transmittance to the second light transmittance through the dimming control device 34 (S203).

The vehicle control device 36 adds (increments) 1 to i (S204).

The vehicle control device 36 determines whether "i>the number of regions" is satisfied (S205). The number of regions is the number of the regions in the light shielding member 5. For example, in the case of FIG. 4, 5, or 6, the number of regions is 2, in the case of FIG. 7, 9, or 10, the number of regions is 3, and in the case of FIG. 8, the number of regions is N.

In step S205, when it is determined that "i≤the number of regions" (S205: NO), the vehicle control device 36 returns the process to step S203.

In step S205, when it is determined that "i>the number of regions" (S205: YES), the vehicle control device 36 completes the present process, calls the process, and returns to the original process.

According to the above process, each region of the light shielding member 5 is sequentially changed from the first light transmittance (for example, non-transmission) to the second light transmittance (for example, transmission) in the first direction.

<Non-Transmission Process>

Figure 14:
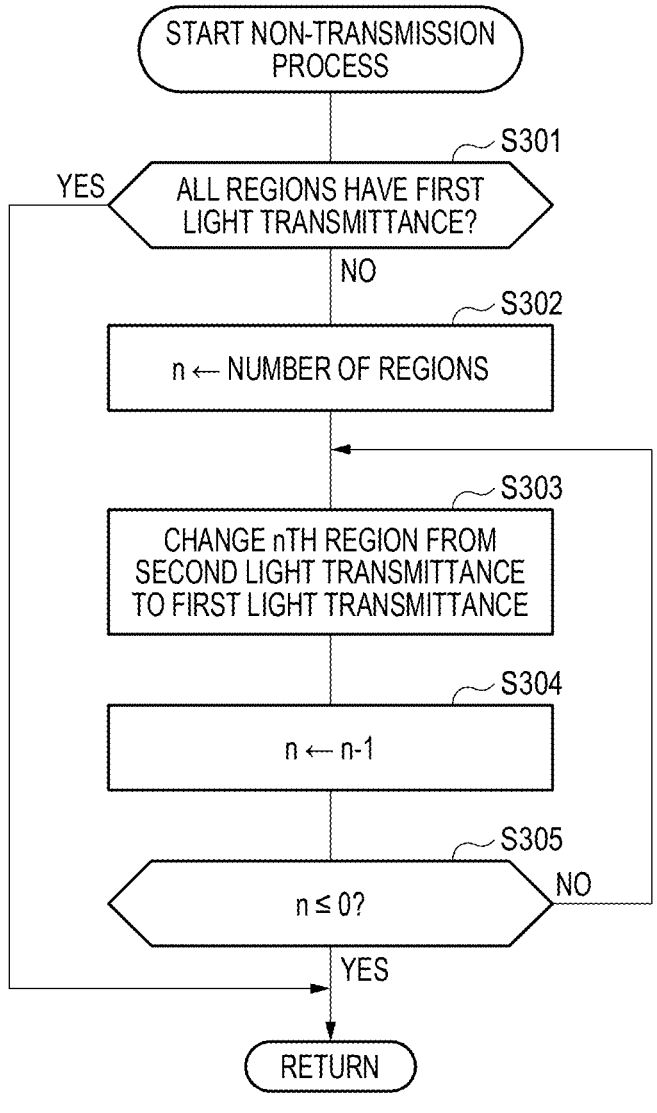
FIG. 14 is a flowchart illustrating an example of a non-transmission process according to Embodiment 1.

FIG. 14 is a flowchart illustrating an example of a non-transmission process according to Embodiment 1. The present process corresponds to details of the process of step S131 in FIG. 12.

The vehicle control device 36 determines whether all the regions have already been in the first light transmittance (S301).

When all the regions have already been in the first light transmittance (S301: YES), the vehicle control device 36 completes the present process, calls the process, and returns to the original process.

When some of the regions do not have the first light transmittance (S301: NO), the vehicle control device 36 sets the number of regions (an initial value) to a variable n (S302).

The control device changes the nth region from the second light transmittance to the first light transmittance through the dimming control device 34 (S303).

The vehicle control device 36 subtracts 1 from n (step S304).

The vehicle control device 36 determines whether "n≤0" is satisfied (S305).

In step S305, if it is determined that "n>0" (S305: NO), the vehicle control device 36 returns the process to step S303.

In step S305, when it is determined that "n≤0" (S305: YES), the vehicle control device 36 completes the present process, calls the process, and returns to the original process.

According to the above process, each region of the light shielding member 5 is sequentially changed from the second light transmittance (for example, transmission) to the first light transmittance (for example, non-transmission) in the second direction.

Embodiment 2

The contents of Embodiment 1 described above can also be applied to doors other than the door 4 of the vehicle 1. In Embodiment 2, a case where the contents of Embodiment 1 described above are applied to a door of a building will be described.

Figure 15:
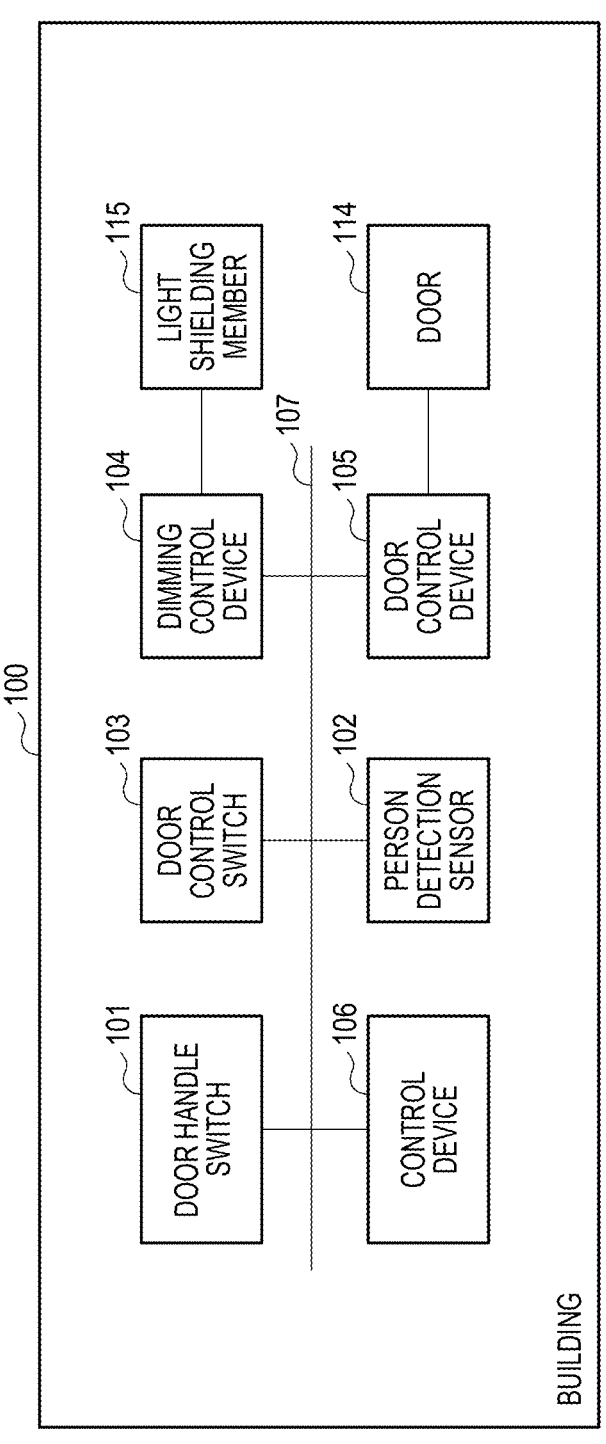
FIG. 15 is a block diagram illustrating an example of a device provided in a building according to Embodiment 2.

FIG. 15 is a block diagram illustrating an example of a device provided in a building 100 according to Embodiment 2.

The building 100 includes a door handle switch 101, a person detection sensor 102, a door control switch 103, a dimming control device 104, a door control device 105, a control device 106, a door 114, and a light shielding member 115.

The door handle switch 101, the person detection sensor 102, the door control switch 103, the dimming control device 104, the door control device 105, and the control device 106 can transmit and receive information to and from each other via a communication network 107. Examples of the communication network 107 include a wired LAN, a wireless LAN, and Bluetooth (registered trademark).

The door handle switch 101, the person detection sensor 102, the door control switch 103, the dimming control device 104, and the door control device 105 are as described in Embodiment 1.

When the door handle switch 101 detects the grip of the handle of the door 114, the control device 106 controls the light transmittance of the light shielding member 115 through the dimming control device 104 as described in Embodiment 1, and controls the opening and closing of the door 114 through the door control device 105 as described in Embodiment 1. When the door control switch 103 is ON (for example, the setting of the automatic door is ON) and the person detection sensor 102 detects a person, the control device 106 controls the light transmittance of the light shielding member 115 through the dimming control device 104 as described in Embodiment 1, and controls the opening and closing of the door 114 through the door control device 105 as described in Embodiment 1. The control device 106 may be replaced with a processor, a CPU, a controller, or the like. The control device 106 may include a volatile storage medium and a non-volatile storage medium such as a memory and a storage. The control device 106 may implement functions according to the present embodiment by executing a predetermined computer program.

Figure 16:
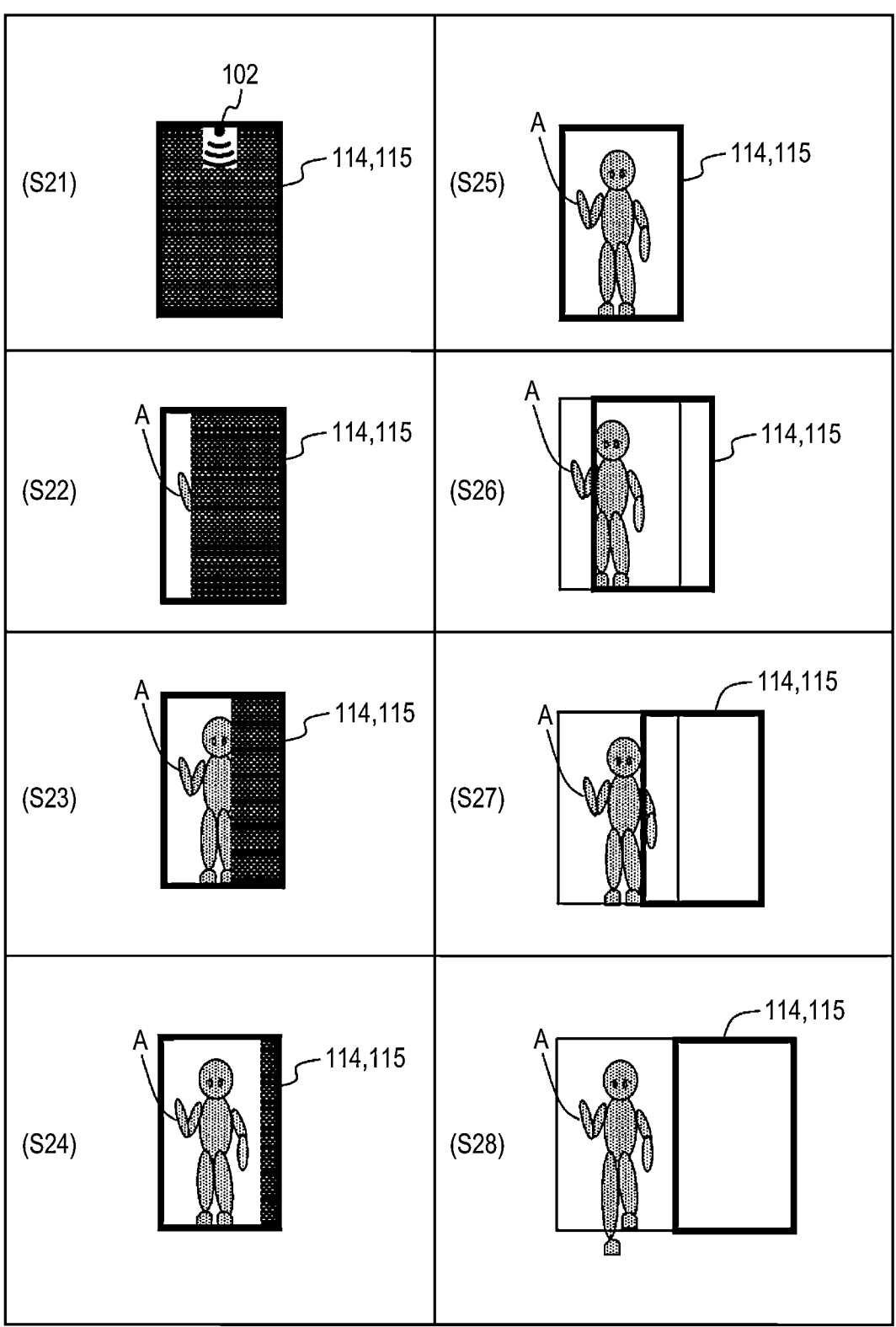
FIG. 16 is a diagram illustrating a relation between an opening operation of a door of the building according to Embodiment 2 and a change in light transmittance of a light shielding member when the door is an automatic door.

FIG. 16 is a diagram illustrating a relation between an opening operation of the door 114 of the building 100 according to Embodiment 2 and a change in light transmittance of the light shielding member 115 when the door 114 is an automatic door.

The control device 106 of the building 100 according to Embodiment 2 may perform the following operation as illustrated in FIG. 15. (S21) When the control device 106 detects, through the person detection sensor 102, a person who stands in front of the door 114, the control device 106 performs the processes in step S22 and subsequent steps. (S22) to (S24) The control device 106 sequentially makes the light transmittance of the light shielding member 115 of the door 114 transparent in the first direction, which is the opening direction of the door 114, through the dimming control device 104 (for example, changes the light transmittance from the first light transmittance to the second light transmittance). Accordingly, the person A can recognize that the door 114 opens and the door 114 that is sequentially transparent opens in the first direction. (S25) to (S28) Then, the control device 106 automatically opens the door 114 in the first direction through the door control device 105, and the person A passes through an entrance or exit.

According to the above processes, since the person A can visually recognize the far side of the door 114 from the transparent door 114, the person A can recognize whether another person is present on the far side of the door 114 before opening the door 114. Thus, the person A can reliably and safely pass through the entrance or exit of the door 114.

Figure 17:
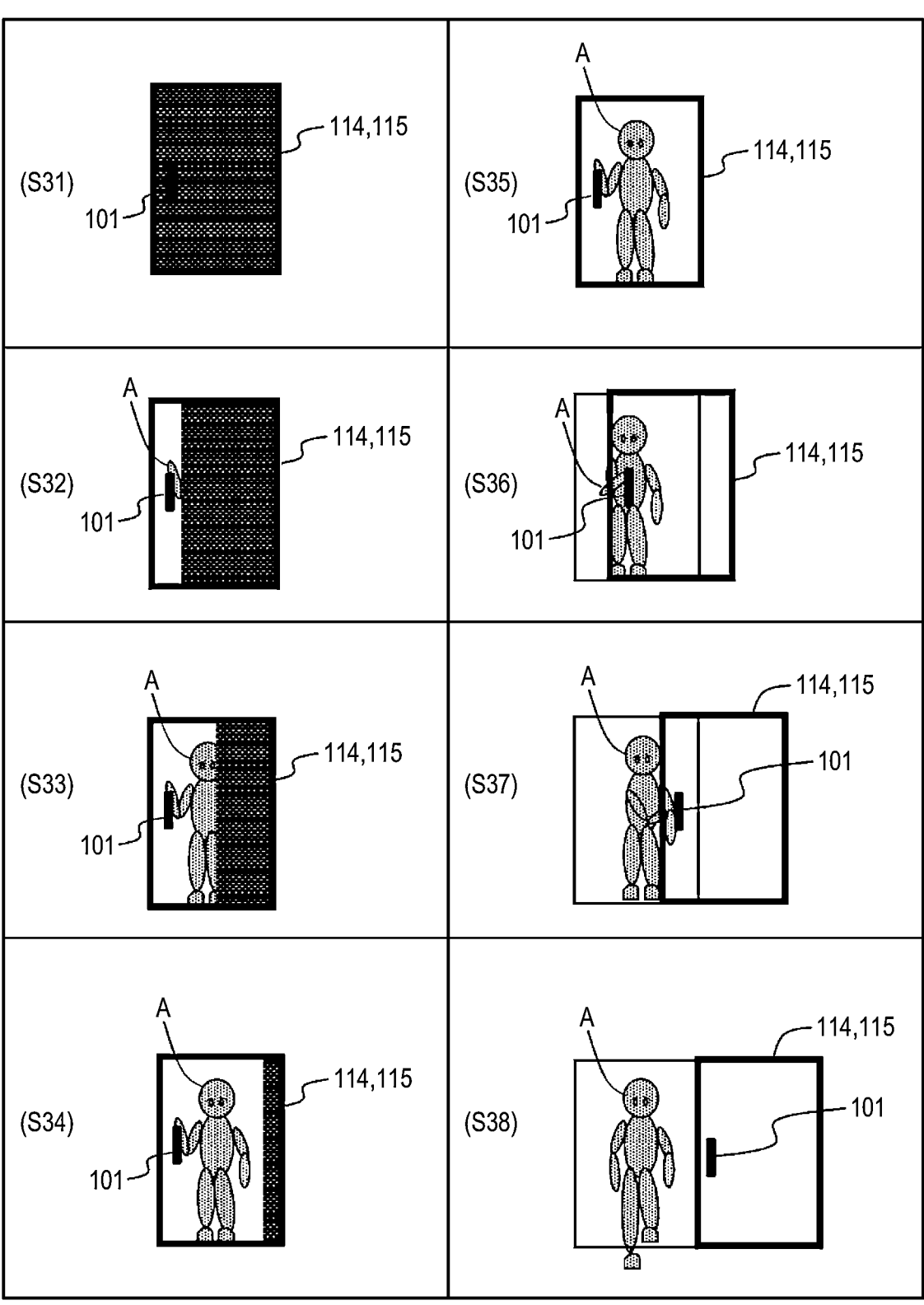
FIG. 17 is a diagram illustrating a relation between an opening operation of a door of the building according to Embodiment 2 and a change in light transmittance of a light shielding member when the door is a manual door.

FIG. 17 is a diagram illustrating a relation between an opening operation of the door 114 of the building 100 according to Embodiment 2 and a change in light transmittance of the light shielding member 115 when the door 114 is a manual door.

The control device 106 of the building 100 according to Embodiment 2 may perform the following operation as illustrated in FIG. 16. (S31) When the control device 106 detects through the door handle switch 101 that the person A has gripped the handle of the door 114, the control device 106 performs the processes in step S32 and subsequent steps. (S32) to (S34) The control device 106 sequentially makes the light transmittance of the light shielding member 115 of the door 114 transparent in the first direction, which is the opening direction of the door 114, through the dimming control device 104 (for example, changes the light transmittance from the first light transmittance to the second light transmittance). Accordingly, the person A can recognize that the door 114 opens in the first direction in which the door 114 is sequentially transparent. (S35) to (S38) The person A manually opens the door 114. The operations of steps S35 to S38 can be performed by the person A at any timing regardless of whether the processes of steps S32 to S34 are completed.

According to the above processes, since the person A can visually recognize the far side of the door 114 from the transparent door 114, the person A can recognize whether another person is present on the far side of the door 114 before opening the door 114. Thus, the person A can reliably and safely pass through the entrance and exit of the door 114.

SUMMARY OF PRESENT DISCLOSURE

The following techniques are disclosed from the above description of Embodiment 1.

Technique 1

A vehicle control method for a vehicle (1) capable of traveling in a predetermined direction using a wheel group (3), in which the vehicle includes: the wheel group (3) connected to a vehicle body (2); a door (4) disposed on the vehicle body and opened by an actuator in a first direction; and a planar light shielding member (5) disposed on the door and having a variable light transmittance and including at least a first region (11) and a second region (12) that are disposed along the first direction, when the vehicle is in a first state, the first region and the second region of the light shielding member of the door have a first light transmittance, when the vehicle is in a second state, the second region remains at the first light transmittance, and the first region has a second light transmittance larger than the first light transmittance, and then, an opening operation of the door in the first direction is completed.

Accordingly, since the light shielding member of the door changes the first region to the second light transmittance, the person can recognize that the door opens in the first direction from the change in light transmittance. In addition, since the person can visually recognize a far side of the door through a region having the second light transmittance, the person can reliably move to the far side of the opened door.

Technique 2

The vehicle control method according to Technique 1, in which when the vehicle is in the second state, the second region remains at the first light transmittance, and the first region has the second light transmittance, then, the first region remains at the second light transmittance, and the second region has the second light transmittance, and then, the opening operation of the door in the first direction is completed.

Accordingly, the light shielding member of the door changes the light transmittance from the first light transmittance to the second light transmittance in the order of the first region and the second region as in the first direction, so that a person can recognize that the door opens in the first direction from a direction in which the light transmittance changes. In addition, since the person can visually recognize a far side of the door through a region having the second light transmittance, the person can reliably move to the far side of the opened door.

Technique 3

The vehicle control method according to Technique 2, in which the light shielding member further includes a third region (13) adjacent to the second region, the first region, the second region, and the third region are disposed along the first direction, when the vehicle is in the first state, the first region, the second region, and the third region of the light shielding member of the door have the first light transmittance, when the vehicle is in the second state, the second region and the third region remain at the first light transmittance, and the first region has the second light transmittance, then, the first region remains at the second light transmittance, the third region remains at the first light transmittance, and the second region has the second light transmittance, then, the first region and the second region remains at the second light transmittance, and the third region has the second light transmittance, and then, the opening operation of the door in the first direction is completed.

Accordingly, the light shielding member of the door changes the light transmittance from the first light transmittance to the second light transmittance in the order of the first region, the second region, and the third region as in the first direction, so that the person can recognize that the door opens in the first direction from the direction in which the light transmittance changes. In addition, since the person can visually recognize a far side of the door through a region having the second light transmittance, the person can reliably move to the far side of the opened door.

Technique 4

The vehicle control method according to Techniques 1 to 3, in which the first state is a state where there is no trigger to open the door in a traveling state or in a stop state of the vehicle, and the second state is a state where there is a trigger to open the door at least in the stop state of the vehicle.

Accordingly, in the second state which is a state where there is a trigger to open the door at least in the stop state of the vehicle, the opening operation of the door is performed, so that the door can be opened safely.

Technique 5

The vehicle control method according to Techniques 1 to 4, in which the door is disposed on a side surface of the vehicle body, and the first direction is a direction along the side surface.

Accordingly, the door opens in the first direction along the side surface of the vehicle body.

Technique 6

The vehicle control method according to Technique 5, in which the door opens in the first direction in a state along the side surface.

Accordingly, the door opens in the first direction along the side surface of the vehicle body.

Technique 7

The vehicle control method according to Techniques 1 to 6, in which the first region is disposed to be in contact with one end of the light shielding member in the first direction, the second region is disposed to be in contact with the other end of the light shielding member in the first direction, when the vehicle is in the second state, at a first time point, the second region remains at the first light transmittance and the first region has the second light transmittance, then, at a second time point, the opening operation of the door in the first direction is completed while the first region remains at the second light transmittance and the second region has the second light transmittance, and the opening operation starts before the second time point, or starts simultaneously with the second time point, or starts later than the second time point.

Thus, by adjusting a change in light transmittance of the light shielding member and a timing of the opening operation of the door, various atmospheres can be created in association with the opening operation of the door.

Technique 8

The vehicle control method according to Techniques 1 to 7, in which the first region is disposed to be in contact with one end of the light shielding member in the first direction, the second region is disposed to be in contact with the other end of the light shielding member in the first direction, (N−2) regions are disposed in order along the first direction between the first region and the second region, the first region is the first region, the second region is the Nth region, when the vehicle is in the first state, the first region to the Nth region has the first light transmittance, when the vehicle is in the second state, at a first time point, the second region to the Nth region remains at the first light transmittance, and the first region has the second light transmittance, then, each of the first light transmittance from the second region to (N−1)th region is sequentially changed to the second light transmittance, then, at a second time point, the first region to the Nth region have the second light transmittance, then, the opening operation of the door in the first direction is completed, N is an integer equal to or greater than 3, and a first time between the first time point and the second time point corresponds to a second time between a start time point and a completion time point of the opening operation.

Accordingly, the person can estimate the second time required for the opening operation of the door in accordance with the first time in which regions sequentially change from the first light transmittance to the second light transmittance.

Technique 9

The vehicle control method according to Technique 8, in which the first time corresponds to the second time, and the first time is between 60% to 140% of the second time.

Accordingly, the person can estimate the second time required for the opening operation of the door in accordance with the first time in which regions sequentially change from the first light transmittance to the second light transmittance.

Technique 10

An automatic door control method, in which the automatic door includes: a door (114) opened by an actuator in a first direction; and a planar light shielding member (115) disposed on the door and having a variable light transmittance and including at least a first region (11) and a second region (12) that are disposed along the first direction, when the vehicle is in a first state, the first region and the second region of the light shielding member of the door have a first light transmittance. The automatic door control method includes, in a case that the vehicle is in a first state, setting the first region and the second region of the light shielding member of the door to a first light transmittance, in a case that the vehicle is in a second state, remaining the second region at the first light transmittance and setting the first region to a second light transmittance larger than the first light transmittance, and completing an opening operation of the door in the first direction.

Accordingly, since the light shielding member of the door changes the first region to the second light transmittance, the person can recognize that the door opens in the first direction from a position of a region where the light transmittance changes. In addition, since the person can visually recognize a far side of the door through a region having the second light transmittance, the person can reliably move to the far side of the opened door.

Technique 11

A vehicle control device (36) configured to be mounted on a vehicle (1) capable of traveling in a predetermined direction using a wheel group (3), in which the vehicle control device includes: the wheel group connected to a vehicle body (2); a door (4) disposed on the vehicle body and opened by an actuator in a first direction; and a planar light shielding member (5) disposed on the door and having a variable light transmittance and including at least a first region (11) and a second region (12) that are disposed along the first direction, when the vehicle is in a first state, the first region and the second region of the light shielding member of the door have a first light transmittance, when the vehicle is in a second state, the second region remains at the first light transmittance, and the first region has a second light transmittance larger than the first light transmittance, and then, an opening operation of the door in the first direction is completed.

Accordingly, since the light shielding member of the door changes the first region to the second light transmittance, a person can recognize that the door opens in the first direction from the change in light transmittance. In addition, since the person can visually recognize a far side of the door through a region having the second light transmittance, the person can reliably move to the far side of the opened door.

Technique 12

The vehicle control device according to Technique 11, in which when the vehicle is in the second state, the second region remains at the first light transmittance, and the first region has the second light transmittance, then, the first region remains at the second light transmittance, and the second region has the second light transmittance, and then, the opening operation of the door in the first direction is completed.

Accordingly, the light shielding member of the door changes the light transmittance from the first light transmittance to the second light transmittance in the order of the first region and the second region as in the first direction, so that a person can recognize that the door opens in the first direction from a direction in which the light transmittance changes. In addition, since the person can visually recognize a far side of the door through a region having the second light transmittance, the person can reliably move to the far side of the opened door.

Technique 13

The vehicle control device according to Technique 12, in which the light shielding member further includes a third region (13) adjacent to the second region, the first region, the second region, and the third region are disposed along the first direction, when the vehicle is in the first state, the first region, the second region, and the third region of the light shielding member of the door have the first light transmittance, when the vehicle is in the second state, the second region and the third region remain at the first light transmittance, and the first region has the second light transmittance, then, the first region remains at the second light transmittance, the third region remains at the first light transmittance, and the second region has the second light transmittance, then, the first region and the second region remains at the second light transmittance, and the third region has the second light transmittance, and then, the opening operation of the door in the first direction is completed.

Accordingly, the light shielding member of the door changes the light transmittance from the first light transmittance to the second light transmittance in the order of the first region, the second region, and the third region as in the first direction, so that the person can recognize that the door opens in the first direction from the direction in which the light transmittance changes. In addition, since the person can visually recognize a far side of the door through a region having the second light transmittance, the person can reliably move to the far side of the opened door.

Technique 14

The vehicle control device according to Techniques 11 to 13, in which the first state is a state where there is no trigger to open the door in a traveling state or in a stop state of the vehicle, and the second state is a state where there is a trigger to open the door at least in the stop state of the vehicle.

Accordingly, in the second state which is a state where there is a trigger to open the door at least in the stop state of the vehicle, the opening operation of the door is performed, so that the door can be opened safely.

Technique 15

The vehicle control device according to Techniques 11 to 14, in which the door is disposed on a side surface of the vehicle body, and the first direction is a direction along the side surface.

Accordingly, the door opens in the first direction along the side surface of the vehicle body.

Technique 16

The vehicle control device according to Technique 15, in which the door opens in the first direction in a state along the side surface.

Accordingly, the door opens in the first direction along the side surface of the vehicle body.

Technique 17

The vehicle control device according to Techniques 11 to 16, in which the first region is disposed to be in contact with one end of the light shielding member in the first direction, the second region is disposed to be in contact with the other end of the light shielding member in the first direction, when the vehicle is in the second state, at a first time point, the second region remains at the first light transmittance and the first region has the second light transmittance, then, at a second time point, the opening operation of the door in the first direction is completed while the first region remains at the second light transmittance and the second region has the second light transmittance, and the opening operation starts before the second time point, or starts simultaneously with the second time point, or starts later than the second time point.

Thus, by adjusting a change in light transmittance of the light shielding member and a timing of the opening operation of the door, various atmospheres can be created in association with the opening operation of the door.

Technique 18

The vehicle control device according to Techniques 11 to 17, in which the first region is disposed to be in contact with one end of the light shielding member in the first direction, the second region is disposed to be in contact with the other end of the light shielding member in the first direction, (N−2) regions are disposed in order along the first direction between the first region and the second region, the first region is the first region, the second region is the Nth region, when the vehicle is in the first state, the first region to the Nth region has the first light transmittance, when the vehicle is in the second state, at a first time point, the second region to the Nth region remains at the first light transmittance, and the first region has the second light transmittance, then, each of the first light transmittance from the second region to (N−1)th region is sequentially changed to the second light transmittance, then, at a second time point, the first region to the Nth region has the second light transmittance, then, the opening operation of the door in the first direction is completed, N is an integer equal to or greater than 3, and a first time between the first time point and the second time point corresponds to a second time between a start time point and a completion time point of the opening operation.

Accordingly, the person can estimate the second time required for the opening operation of the door in accordance with the first time in which regions sequentially change from the first light transmittance to the second light transmittance.

Technique 19

The vehicle control device according to Technique 18, in which the first time corresponds to the second time, and the first time is between 60% to 140% of the second time.

Accordingly, the person can estimate the second time required for the opening operation of the door in accordance with the first time in which regions sequentially change from the first light transmittance to the second light transmittance.

Technique 20

A control device (106) for an automatic door including a door (114) opened by an actuator in a first direction; and a planar light shielding member (115) disposed on the door and having a variable light transmittance and including at least a first region (11) and a second region (12) that are disposed along the first direction. When the vehicle is in a first state, the first region and the second region of the light shielding member of the door have a first light transmittance. When the vehicle is in a second state, the second region remains at the first light transmittance, and the first region has a second light transmittance larger than the first light transmittance. Thereafter, an opening operation of the door in the first direction is completed.

Accordingly, since the light shielding member of the door changes the first region to the second light transmittance, the person can recognize that the door opens in the first direction from a position of a region where the light transmittance changes. In addition, since the person can visually recognize a far side of the door through a region having the second light transmittance, the person can reliably move to the far side of the opened door.

Although the embodiments have been described above with reference to the accompanying drawings, the present disclosure is not limited thereto. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, components in the embodiment described above may be combined freely in a range without departing from the gist of the invention.

INDUSTRIAL APPLICABILITY

The technique of the present disclosure is useful for a door provided with a light shielding member capable of adjusting a light transmittance.

CROSS-REFERENCE TO RELATED APPLICATIONS

This application is based on and claims priority under 35 USC 119 from Japanese Patent Application No. 2023-181387 filed on Oct. 20, 2023, the contents of which are incorporated herein by reference.

What is claimed is:

1. A vehicle control method for a vehicle capable of traveling in a predetermined direction using a wheel group, wherein
   the vehicle includes:
   a vehicle body;
   the wheel group connected to the vehicle body;
   a door disposed on the vehicle body and opened by an actuator in a first direction; and
   a planar light shielding member disposed on the door, having a variable light transmittance and including at least a first region and a second region that are disposed along the first direction,
   while the vehicle is in a first state, the first region and the second region of the light shielding member in the door have a first light transmittance,
   while the vehicle is in a second state, the second region remains at the first light transmittance, and the first region has a second light transmittance larger than the first light transmittance, and
   then an opening operation of the door in the first direction is completed.

2. The vehicle control method according to claim 1, wherein
   while the vehicle is in the second state, the second region remains at the first light transmittance, and the first region has the second light transmittance,
   then, the first region remains at the second light transmittance, and the second region has the second light transmittance, and
   then, the opening operation of the door in the first direction is completed.

3. The vehicle control method according to claim 2, wherein
   the light shielding member further includes a third region adjacent to the second region,
   the first region, the second region, and the third region are disposed along the first direction,
   while the vehicle is in the first state, the first region, the second region, and the third region of the light shielding member of the door have the first light transmittance,
   while the vehicle is in the second state, the second region and the third region remain at the first light transmittance, and the first region has the second light transmittance,
   then, the first region remains at the second light transmittance, the third region remains at the first light transmittance, and the second region has the second light transmittance,
   then, the first region and the second region remains at the second light transmittance, and the third region has the second light transmittance, and then, the opening operation of the door in the first direction is completed.

4. The vehicle control method according to claim 1, wherein
   the first state is a state where there is no trigger to open the door in a traveling state of the vehicle or in a stop state of the vehicle, and
   the second state is a state where there is a trigger to open the door at least in the stop state of the vehicle.

5. The vehicle control method according to claim 1, wherein
   the door is disposed on a side surface of the vehicle body, and
   the first direction is a direction along the side surface.

6. The vehicle control method according to claim 5, wherein
   the door opens in the first direction in a state along the side surface.

7. The vehicle control method according to claim 1, wherein
   the first region is disposed to be in contact with one end of the light shielding member in the first direction,
   the second region is disposed to be in contact with another end of the light shielding member in the first direction,
   while the vehicle is in the second state, at a first time point, the second region remains at the first light transmittance, and the first region has the second light transmittance,
   then, at a second time point, the opening operation of the door in the first direction is completed while the first region remains at the second light transmittance and the second region has the second light transmittance, and
   the opening operation
   starts before the second time point,
   starts simultaneously with the second time point, or
   starts later than the second time point.

8. The vehicle control method according to claim 1, wherein
   the first region is disposed to be in contact with one end of the light shielding member in the first direction,
   the second region is disposed to be in contact with another end of the light shielding member in the first direction,
   (N−2) regions are disposed in order along the first direction between the first region and the second region,
   the first region is the first region, the second region is the Nth region,
   while the vehicle is in the first state, the first region to the Nth region has the first light transmittance,
   while the vehicle is in the second state, at a first time point, the second region to the Nth region remains at the first light transmittance, and the first region has the second light transmittance,
   then, each of the first light transmittance from the second region to (N−1)th region is sequentially changed to the second light transmittance,
   then, at a second time point, the first region to the Nth region has the second light transmittance,
   then, the opening operation of the door in the first direction is completed,
   N is an integer equal to or greater than 3, and
   a first time between the first time point and the second time point corresponds to a second time between a start time point and a completion time point of the opening operation.

9. The vehicle control method according to claim 8, wherein
   the first time is between 60% to 140% of the second time.

10. An automatic door control method, wherein
the automatic door is disposed on a vehicle and includes:
    a door opened by an actuator in a first direction; and
    a planar light shielding member disposed on the door
       and having a variable light transmittance and includ-
       ing at least a first region and a second region that are
       disposed along the first direction,
the automatic door control method includes:
    while the vehicle is in a first state, setting the first
       region and the second region of the light shielding
       member of the door to a first light transmittance,
    while the vehicle is in a second state, maintaining the
       second region at the first light transmittance and
       setting the first region to a second light transmittance
       larger than the first light transmittance, and
       completing an opening operation of the door in the
         first direction.

11. A vehicle control device configured to be mounted on
a vehicle capable of traveling in a predetermined direction
using a wheel group, wherein
    the vehicle control device includes:
       a vehicle body;
       a wheel group connected to the vehicle body;
       a door disposed on the vehicle body and opened by an
         actuator in a first direction; and
       a planar light shielding member disposed on the door
         and having a variable light transmittance and includ-
         ing at least a first region and a second region that are
         disposed along the first direction,
    while the vehicle is in a first state, the first region and the
       second region of the light shielding member of the door
       have a first light transmittance,
    while the vehicle is in a second state, the second region
       remains at the first light transmittance, and the first
       region has a second light transmittance larger than the
       first light transmittance, and
    then, an opening operation of the door in the first direction
       is completed.

12. The vehicle control device according to claim 11,
wherein
    while the vehicle is in the second state, the second region
       remains at the first light transmittance, and the first
       region has the second light transmittance,
    then, the first region remains at the second light transmit-
       tance, and the second region has the second light
       transmittance, and
    then, the opening operation of the door in the first
       direction is completed.

13. The vehicle control device according to claim 12,
wherein
    the light shielding member further includes a third region
       adjacent to the second region,
    the first region, the second region, and the third region are
       disposed along the first direction,
    while the vehicle is in the first state, the first region, the
       second region, and the third region of the light shield-
       ing member of the door have the first light transmit-
       tance,
    when the vehicle is in the second state, the second region
       and the third region remain at the first light transmit-
       tance, and the first region has the second light trans-
       mittance,
    then, the first region remains at the second light transmit-
       tance, the third region remains at the first light trans-
       mittance, and the second region has the second light
       transmittance, then, the first region and the second region remains at the
    second light transmittance, and the third region has the
    second light transmittance, and
then, the opening operation of the door in the first
    direction is completed.

14. The vehicle control device according to claim 11,
wherein
    the first state is a state where there is no trigger to open
       the door in a traveling state or in a stop state of the
       vehicle, and
    the second state is a state where there is a trigger to open
       the door at least in the stop state of the vehicle.

15. The vehicle control device according to claim 11,
wherein
    the door is disposed on a side surface of the vehicle body,
       and
    the first direction is a direction along the side surface.

16. The vehicle control device according to claim 15,
wherein
    the door opens in the first direction in a state along the side
       surface.

17. The vehicle control device according to claim 11,
wherein
    the first region is disposed to be in contact with one end
       of the light shielding member in the first direction,
    the second region is disposed to be in contact with the
       other end of the light shielding member in the first
       direction,
    while the vehicle is in the second state, at a first time
       point, the second region remains at the first light
       transmittance and the first region has the second light
       transmittance,
    then, at a second time point, the opening operation of the
       door in the first direction is completed while the first
       region remains at the second light transmittance and the
       second region has the second light transmittance, and
    the opening operation
       starts before the second time point, or
       starts simultaneously with the second time point, or
       starts later than the second time point.

18. The vehicle control device according to claim 11,
wherein
    the first region is disposed to be in contact with one end
       of the light shielding member in the first direction,
    the second region is disposed to be in contact with the
       other end of the light shielding member in the first
       direction,
    (N−2) regions are disposed in order along the first direc-
       tion between the first region and the second region,
    the first region is the first region, the second region is the
       Nth region,
    while the vehicle is in the first state, the first region to the
       Nth region has the first light transmittance,
    while the vehicle is in the second state, at a first time
       point, the second region to the Nth region remains at
       the first light transmittance, and the first region has the
       second light transmittance,
    then, each of the first light transmittance from the second
       region to (N−1)th region is sequentially changed to the
       second light transmittance,
    then, at a second time point, the first region to the Nth
       region has the second light transmittance,
    then, the opening operation of the door in the first
       direction is completed,
    N is an integer equal to or greater than 3, and
    a first time between the first time point and the second
       time point corresponds to

23 a second time between a start time point and a completion time point of the opening operation.

19. The vehicle control device according to claim 18, wherein the first time is between 60% to 140% of the second time.

20. A control device for an automatic door including a door opened by an actuator in a first direction, and a planar light shielding member disposed on the door and having a variable light transmittance and including at least a first region and a second region that are disposed along the first direction, wherein the automatic door is disposed on a vehicle; and while the vehicle is in a first state, the first region and the second region of the light shielding member of the door have a first light transmittance, while the vehicle is in a second state, the second region remains at the first light transmittance, and the first region has a second light transmittance larger than the first light transmittance, and then, an opening operation of the door in the first direction is completed.

\* \* \* \* \*

24